United States Patent
Delaye et al.

(10) Patent No.: US 11,386,644 B2
(45) Date of Patent: Jul. 12, 2022

(54) IMAGE PREPROCESSING FOR GENERALIZED IMAGE PROCESSING

(71) Applicant: Xilinx, Inc., San Jose, CA (US)

(72) Inventors: Elliott Delaye, San Jose, CA (US); Ashish Sirasao, San Jose, CA (US); Aaron Ng, San Jose, CA (US); Yongjun Wu, Cupertino, CA (US); Jindrich Zejda, Saratoga, CA (US)

(73) Assignee: XILINX, INC., San Jose, CA (US)

(*) Notice: Subject to any disclaimer, the term of this patent is extended or adjusted under 35 U.S.C. 154(b) by 72 days.

(21) Appl. No.: 15/786,267

(22) Filed: Oct. 17, 2017

(65) Prior Publication Data

US 2019/0114499 A1 Apr. 18, 2019

(51) Int. Cl.
| | |
|---|---|
| *G06V 10/94* | (2022.01) |
| *G06F 3/06* | (2006.01) |
| *G06F 17/15* | (2006.01) |
| *G06N 3/04* | (2006.01) |
| *G06N 3/063* | (2006.01) |
| *G06T 1/20* | (2006.01) |

(Continued)

(52) U.S. Cl.
CPC .......... *G06V 10/955* (2022.01); *G06F 3/0604* (2013.01); *G06F 3/0656* (2013.01); *G06F 3/0683* (2013.01); *G06F 17/153* (2013.01); *G06N 3/04* (2013.01); *G06N 3/063* (2013.01); *G06T 1/20* (2013.01); *G06T 1/60* (2013.01); *G06V 10/454* (2022.01); *G06V 10/95* (2022.01)

(58) Field of Classification Search
CPC ............. G06K 9/00986; G06K 9/4628; G06K 9/00979; G06F 17/153; G06F 3/0683; G06F 3/0604; G06F 3/0656; G06N 3/063; G06N 3/04; G06T 1/20; G06T 1/60

See application file for complete search history.

(56) References Cited

U.S. PATENT DOCUMENTS

| | | | |
|---|---|---|---|
| 6,346,825 B1 | 2/2002 | Pang et al. | |
| 6,744,929 B1* | 6/2004 | Okada | H04N 19/37 |
| | | | 375/E7.184 |
| 9,235,498 B1* | 1/2016 | Southard | H03K 19/1737 |

(Continued)

OTHER PUBLICATIONS

Akesson, Benny, "An introduction to SDRAM and memory controllers," downloaded Sep. 25, 2017 from http://www.es.ele.tue.nl/premadona/files/akesson01.pdf, pp. 1-30, Eindhoven University of Technology, Eindhoven, The Netherlands.

(Continued)

*Primary Examiner* — John W Lee
(74) *Attorney, Agent, or Firm* — Patterson + Sheridan, LLP

(57) ABSTRACT

An example preprocessor circuit includes: a first buffer configured to store rows of image data and output a row thereof; a second buffer, coupled to the first buffer, including storage locations to store respective image samples of the row output by the first buffer; shift registers; an interconnect network including connections, each connection coupling a respective one of the shift registers to more than one of the storage locations, one or more of the storage locations being coupled to more than one of the connections; and a control circuit configured to load the shift registers with the image samples based on the connections and shift the shift registers to output streams of image samples.

17 Claims, 17 Drawing Sheets

(51) Int. Cl.
*G06T 1/60* (2006.01)
*G06V 10/44* (2022.01)

(56) References Cited

U.S. PATENT DOCUMENTS

| | | | | |
|---|---|---|---|---|
| 2005/0175138 | A1* | 8/2005 | Matsuda | G11C 19/00 377/64 |
| 2007/0176881 | A1* | 8/2007 | Lin | G09G 3/3685 345/100 |
| 2007/0268232 | A1* | 11/2007 | Ku | G09G 3/3688 345/100 |
| 2008/0059091 | A1* | 3/2008 | Watanabe | H04B 17/0085 702/66 |
| 2013/0223764 | A1* | 8/2013 | Tripathi | G06T 3/4007 382/298 |
| 2015/0086134 | A1* | 3/2015 | Hameed | G06T 1/20 382/279 |
| 2017/0287105 | A1 | 10/2017 | Meixner et al. | |
| 2019/0114529 | A1* | 4/2019 | Ng | G06N 3/063 |

OTHER PUBLICATIONS

Chetlur, Sharan et al., "cuDNN: Efficient Primitives for Deep Learning," submitted Oct. 3, 2014, pp. 1-9, https://arxiv.org/pdf/1410.0759.pdf, Cornell University Library.

Di Carlo, Stefano et al., "An Area-Efficient 2-D Convolution Implementation on FPGA for Space Applications," Proc. of the 2011 IEEE 6th International Design & Test Workshop, Dec. 11, 2011, pp. 88-92, IEEE, Piscataway, New Jersey, USA.

Gysel, Philipp, "Ristretto: Hardware-Oriented Approximation of Convolutional Neural Networks," May 20, 2016, pp. 1-73, https://arxiv.org/abs/1605.06402, Cornell University Library.

Khronos, "clSetKernelArg," downloaded Sep. 22, 2017 from https://www.khronos.org/registry/OpenCL/sdk/1.0/docs/man/xhtml/clSetKernelArg.html, copyright 2007, pp. 1-4, Khronos Group, Beaverton, Oregon, USA.

Krizhevsky, Alex et al., "ImageNet Classification with Deep Convolutional Neural Networks," Proc. of the 12th International Conference on Neural Processing Systems, Dec. 2012, pp. 1097-1105, ACM Digital Library, www.acm.org.

Mathworks, "im2col," dowloaded Sep. 22, 2017 from https://www.mathworks.com/help/images/ref/im2col.html?searchHighlight=im2col&s_tid=doc_srchtitle, pp. 1-3.

Saxena, Abhineet, "Convolutional Neural Networks (CNNs): An Illustrated Explanation," Jun. 20, 2016, downloaded Sep. 25, 2017 from http://xrds.acm.org/blog/2016/06/convolutional-neural-networks-cnns-illustrated-explanation/, pp. 1-15.

Shaaban, Muhammed, "Systolic Architectures," Mar. 11, 2003, Kate Gleason College of Engineering, Rochester Institute of Technology, Rochester, New York, USA.

Stanford, "CS231n Convolutional Neural Networks for Visual Recognition," downloaded Sep. 25, 2017 from http://cs231n.stanford.edu/, pp. 1-23, Stanford University, Stanford, California, USA.

Warden, Pete, "Why GEMM is at the heart of deep learning," Apr. 20, 2015, pp. 1-9, downloaded from https://petewarden.com/2015/04/20/why-gemm-is-at-the-heart-of-deep-learning/.

Wikipedia, "Convolutional neural network," Sep. 20, 2017, pp. 1-13, downloaded from https://en.wikipedia.org/wiki/Convolutional_neural_network.

Wikipedia, "Deep learning," Sep. 24, 2017, pp. 1-13, downloaded from https://en.wikipedia.org/wiki/Deep_learning.

Wikpedia, "Matrix Multiplication," Sep. 20, 2017, pp. 1-19, downloaded from https://en.wikipedia.org/wiki/Matrix_multiplication.

Wikipedia, "Multiprocessing," May 10, 2017, pp. 1-4, dowloaded from https://en.wikipedia.org/wiki/Multiprocessing.

Wikipedia, "Producer-consumer problem," Sep. 7, 2017, pp. 1-9, downloaded from https://en.wikipedia.org/wiki/Producer%E2%80%93consumer_problem.

Wikipedia, "Row- and colum-major order," Aug. 23, 2017, pp. 1-5, downloaded from https://en.wikipedia.org/wiki/Row-_and_column-major_order.

Wikipedia, "Systolic array," Mar. 22, 2017, pp. 1-5, downloaded from https://en.wikipedia.org/wiki/Systolic_array.

Wikipedia, "Very long instruction word," Jul. 13, 2017, pp. 1-3, downloaded from https://en.wikipedia.org/wiki/Very_long_instruction_word.

Xilinx, "Smarter Data Center," downloaded Sep. 22, 2017 from https://www.xilinx.com/applications/data-center.html, pp. 1-4, Xilinx, Inc., San Jose, California, USA.

Xilinx, "SDSoC Development Environment," downloaded Sep. 22, 2017 from https://www.xilinx.com/products/design-tools/software-zone/sdsoc.html, pp. 1-16, Xilinx, Inc., San Jose, California, USA.

Xilinx, "UltraScale Architecture DSP Slice User Guide," UG579 (v1.3), Nov. 24, 2015, pp. 1-74, Xilinx, Inc., San Jose, California, USA.

Xilinx, "Vivado High-Level Synthesis," downloaded Sep. 22, 2017 from https://www.xilinx.com/products/design-tools/vivado/integration/esl-design.html, pp. 1-2, Xilinx, Inc., San Jose, California, USA.

Xilinx, "Deep Learning with INT8 Optimization on Xilinx Devices," WP486 (v1.0.1), Apr. 24, 2017, pp. 1-11, Xilinx, Inc., San Jose, California, USA.

Xilinx, "Implementing Memory Structures for Video Processing in the Vivado HLS Tool," XAPP793 (v1.0), Sep. 20, 2012, pp. 1-8, Xilinx, Inc., San Jose, California, USA.

Xilinx, "Two-Dimensional Linear Filtering," XAPP933 (v1.1), Oct. 23, 2007, pp. 1-8, Xilinx, Inc., San Jose, California, USA.

Chen, YH., et al., "Eyeriss: an Energy-Efficient Reconfigurable Accelerator for Deep Convolutional Neural Networks", IEEE Journal of Solid-State Circuits, vol. 52, No. 1, pp. 127-138, Jan. 1, 2017, Piscataway, NJ, USA.

Liu Z., et al., "Throughput-Optimized FPGA Accelerator for Deep Convolutional Neural Networks", ACM Transactions an Recogfigurabie Technology and Systems, vol. 10, No. 3, Jul. 19, 2017, pp. 17:1-17:23.

Zhang, C., et al., "Optimizing FPGA-based Accelerator Design for Deep Convolutional Neural Networks", Proceeding if the 2015 ACM/SIGDA International Symposium on Field-Programmable Gate Arrays, FPGA '15, Feb. 22, 2015, pp. 161-170, New York, NY, USA.

* cited by examiner

IMAGE PREPROCESSING FOR GENERALIZED IMAGE PROCESSING

TECHNICAL FIELD

Examples of the present disclosure generally relate to computing systems and electronic circuits and, in particular, to image preprocessing for generalized image processing.

BACKGROUND

Machine learning is the science of inducing computing systems to act without being explicitly programmed. Classical machine learning includes various clustering and classification techniques, including K-means clustering, linear and logistic regressions, stochastic gradient decent, association rule learning, and the like. Deep learning is a newer frontier in machine learning. Deep learning is a class of machine learning algorithms that uses multiple layers of nonlinear processing units for feature extraction and transformation. Deep learning algorithms can be unsupervised (e.g., pattern analysis) or supervised (e.g., classification). The deep learning algorithm can be implemented using layers of an artificial neural network (ANN) (referred to herein as a "neural network").

In general, a neural network is a collection of nodes (i.e., the "neurons") that are connected in a graph. A node in a neural network computes a sum of weighted inputs and adds an optional bias to the sum. The output of the node is a function of the final sum (referred to as an "activation function"). Example activation functions include the sigmoid function, the hyperbolic tangent (tanh) function, the Rectified Linear Unit (ReLU) function, and the identity function. Neural network models are often organized into layers of nodes, which define a specific topology, and corresponding weights and biases. The weights and biases are referred to as network parameters.

In general, a neural network includes an input layer and an output layer and can optionally include one or more hidden layers between the input and output layers. A neural network used in deep learning applications typically includes many hidden layers, which gives rise to the term deep neural network (DNN). The layers of a neural network can be densely connected (e.g., each node in a layer is fully connected to all nodes in a previous layer) or sparsely connected (e.g., each node in a layer is connected to only a portion of the nodes in a previous layer). A convolutional neural network (CNN) is a type of DNN that includes one or more sparsely connected layers, referred to as convolutional layers. A CNN is well-suited for processing image or video data. Other types of DNNs include recurrent neural network (RNNs), which are well-suited for processing speech and text data.

Convolution operations can be performed using a number of techniques, which are typically limited by the ability to use a large number of digital signal processors (DSPs), the requirement of on-chip buffers, and/or the data access patterns. One example convolution technique creates a shift register of samples that are fed into a DSP array. This technique is limited in terms of not being able to use striding or dilated convolutions in which the convolution window skips columns and rows in the input image. This is due to a conflict between use of the shift registers to cycle through samples in sequence and the stride or dilation that skips or jumps samples in the input image. Accordingly, it is desirable to provide an improved architecture to compute parallel generalized convolutions.

SUMMARY

Techniques for image preprocessing are described. In an example, a preprocessor circuit for formatting image data into a plurality of streams of image samples includes: a first buffer configured to store a plurality of rows of the image data and output a row of the plurality of rows; a second buffer, coupled to the first buffer, including a plurality of storage locations to store a respective plurality of image samples of the row output by the first buffer; a plurality of shift registers; an interconnect network including a plurality of connections, each connection coupling a respective one of the plurality of shift registers to more than one of the plurality of storage locations, one or more of the plurality of storage locations being coupled to more than one of the plurality of connections; and a control circuit configured to load the plurality of shift registers with the plurality of image samples based on the plurality of connections and shift the plurality of shift registers to output the plurality of streams of image samples.

In another example, an integrated circuit (IC) includes: a memory controller configured to access a memory having image data stored therein; an image preprocessor, coupled to the memory controller, configured to obtain the image data and generate a plurality of streams of image samples from the image data; and a processor, coupled to the image preprocessor, configured to process the plurality of streams of image samples. The image preprocessor includes: a first buffer configured to store a plurality of rows of the image data and output a row of the plurality of rows; a second buffer, coupled to the first buffer, including a plurality of storage locations to store a respective plurality of image samples of the row output by the first buffer; a plurality of shift registers; an interconnect network including a plurality of connections, each connection coupling a respective one of the plurality of shift registers to more than one of the plurality of storage locations, one or more of the plurality of storage locations being coupled to more than one of the plurality of connections; and a control circuit configured to load the plurality of shift registers with the plurality of image samples based on the plurality of connections and shift the plurality of shift registers to output the plurality of streams of image samples.

In another example, a method of formatting image data into a plurality of streams of image samples includes: storing a plurality of rows of the image data, and an output row of the plurality of rows, in first buffer; storing a respective plurality of image samples of the row output by the first buffer in a second buffer having a plurality of storage locations; loading a plurality of shift registers with the plurality of image samples based on a plurality of connections of an interconnection network, each connection coupling a respective one of the plurality of shift registers to more than one of the plurality of storage locations, one or more of the plurality of storage locations being coupled to more than one of the plurality of connections; and shifting the plurality of shift registers to output the plurality of streams of image samples.

These and other aspects may be understood with reference to the following detailed description.

BRIEF DESCRIPTION OF THE DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

To facilitate understanding, identical reference numerals have been used, where possible, to designate identical elements that are common to the figures. It is contemplated that elements of one example may be beneficially incorporated in other examples.

DETAILED DESCRIPTION

Figure 1:
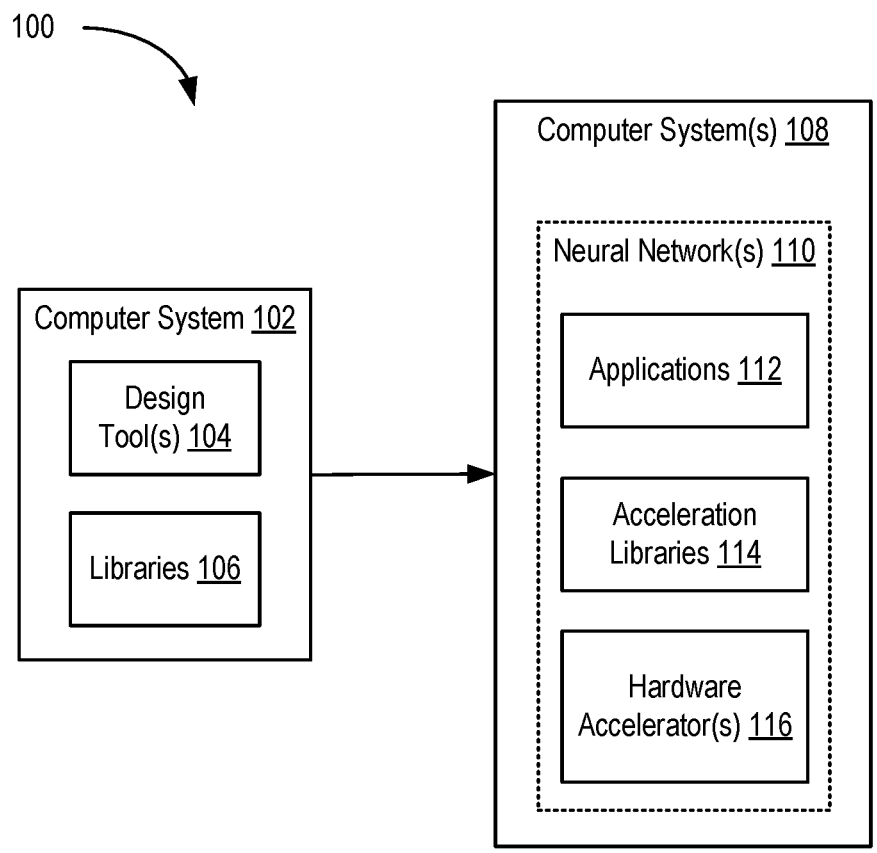
FIG. 1 is a block diagram depicting a system for implementing neural networks according to an example.

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description of the claimed invention or as a limitation on the scope of the claimed invention. In addition, an illustrated example need not have all the aspects or advantages shown. An aspect or an advantage described in conjunction with a particular example is not necessarily limited to that example and can be practiced in any other examples even if not so illustrated or if not so explicitly described.

Techniques for image preprocessing are described. An image preprocessor includes an architecture of multiplexers, buffers, and shift registers that can generate a large number of data samples every clock cycle to perform image processing operations, such as convolution. The architecture supports strided or dilated access patterns of the input image data. The architecture allows for implementation of image processing, such as convolution, using a large systolic array, which is particularly useful for implementing convolutional neural networks (CNNs). For convolution, the architecture balances the memory latency of reading the input image against the convolutional size in order to make the convolution run at maximum efficiency with minimal buffers, minimal levels of logic, and reducing memory bandwidth. The architecture also supports various convolutional filter sizes with minimal area penalty, which is advantageous for CNNs that change convolutional filter sizes dynamically. These and further aspects of the architecture are described below with respect to the drawings.

FIG. 1 is a block diagram depicting a system 100 for implementing neural networks according to an example. The system 100 includes a computer system 102 and one or more computer systems 108. The computer system 102 includes conventional computing components configured to execute software that provides one or more design tools 104. Each computer system 108 executes one or more neural networks 110. The neural network(s) 110 are implemented using applications 112, acceleration libraries 114, and one or more hardware accelerators 116.

In an example, the hardware accelerator(s) 116 include programmable integrated circuits (ICs), such as field programmable gate arrays (FPGAs). The acceleration libraries 114 provide application programming interfaces (APIs) to interface with the hardware accelerator(s) 116. The acceleration libraries 114 can also include libraries that provide neural network functions, including predefined and optimized implementations of neural network layers and other types of neural network structures. Thus, the neural network(s) 110 can include both hardware portions implemented in the hardware accelerator(s) 116, as well as software portions implemented in the acceleration libraries 114. The applications 112 invoke the APIs of the acceleration libraries 114 to program and control the hardware accelerator(s) 116 to implement the neural network(s) 116.

A designer interacts with the design tool(s) 104 to define the neural network(s) 110. The design tool(s) 104 can generate files for programming the hardware accelerator(s) 116 (e.g., configuration bitstreams for FPGAs), files that provide the acceleration libraries 114, and files that provide the applications 112. The designer can define the hardware portions of the neural network(s) 110 using a register transfer language (RTL) or using a programming language, such as C, C++, OpenCL, and the like, or a combination of RTL and programmable language(s). The user can define the software portions of the neural network(s) 110 using a programming language, such as C, C++, OpenCL, etc. The design tool(s) 104 compile the software-defined neural networks to generate files for programming the hardware accelerator(s) 116 and library files for the acceleration libraries 114. The designer can make use of libraries 106 that provide class libraries, template libraries, and the like to assist in developing the hardware and software portions of the neural network(s) 110.

A user can define the applications 112 using a programming language (e.g., C, C++, Python, etc.). The user can make use of neural network frameworks and libraries, such as Caffe, TensorFlow, MXNet, and the like.

Figure 2:
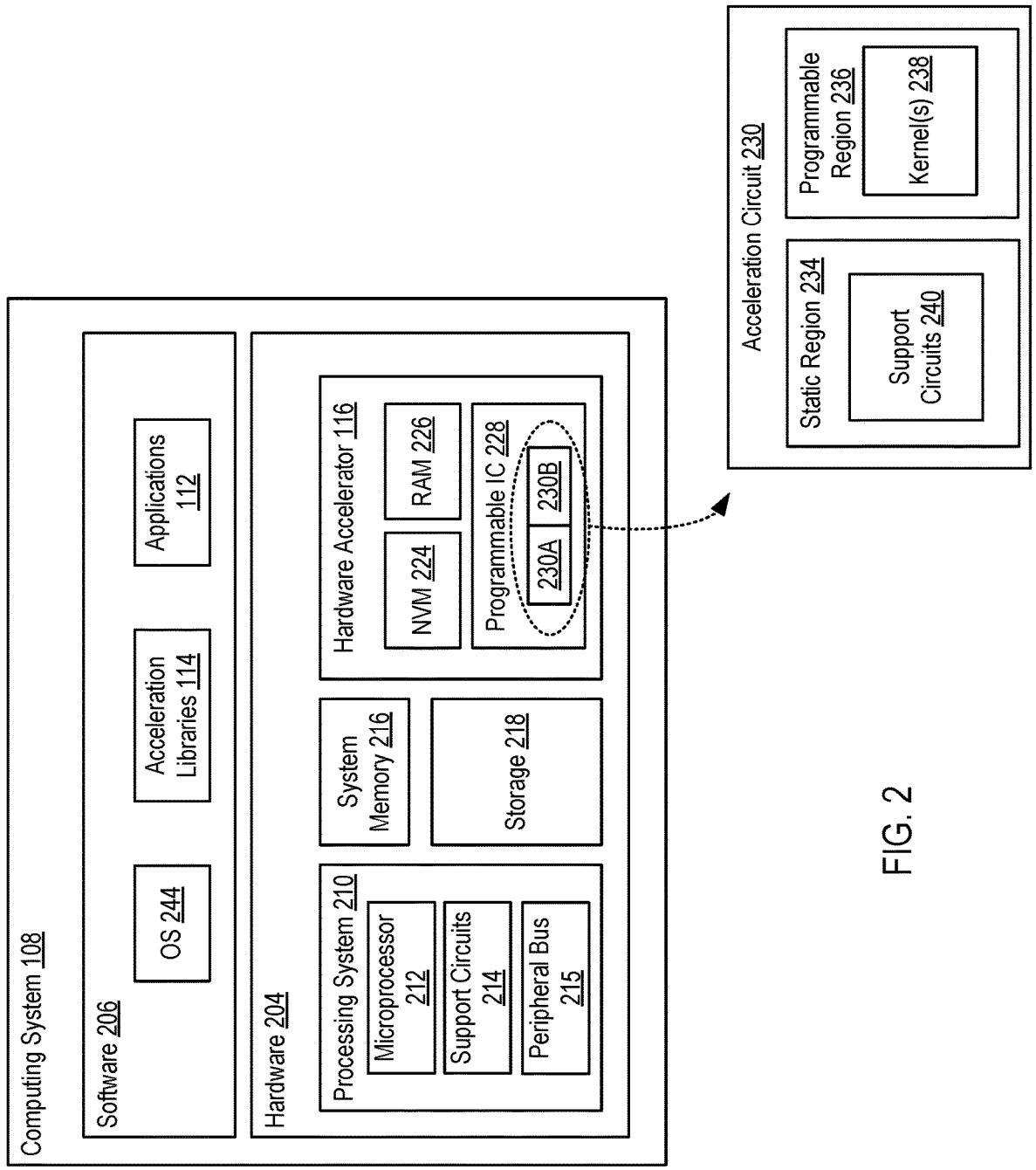
FIG. 2 is a block diagram depicting a computing system according to an example.

FIG. 2 is a block diagram depicting a computing system 108 according to an example. The computing system 108 includes hardware 204 and software 206 executing on the hardware 204. The hardware 204 includes a processing system 210, system memory 1216, storage devices ("storage 218"), and a hardware accelerator 116. The software 206 includes an operating system (OS) 244, the acceleration libraries 114, and the applications 112.

The processing system 210 includes a microprocessor 212, support circuits 214, and a peripheral bus 215. The microprocessor 212 can be any type of general-purpose central processing unit (CPU), such as an x86-based processor, ARM®-based processor, or the like. The microprocessor 212 can include one or more cores and associated circuitry (e.g., cache memories, memory management units (MMUs), interrupt controllers, etc.). The microprocessor 212 is configured to execute program code that perform one or more operations described herein and which can be stored in the system memory 216 and/or the storage 218. The support circuits 214 include various devices that cooperate with the microprocessor 212 to manage data flow between the microprocessor 212, the system memory 216, the storage 218, the hardware accelerator 116, or any other peripheral device. For example, the support circuits 214 can include a chipset (e.g., a north bridge, south bridge, platform host controller, etc.), voltage regulators, firmware (e.g., a BIOS), and the like. The support circuits 214 manage data flow between the microprocessor 212 and the peripheral bus 215, to which various peripherals, such as the hardware accelerator 116, are connected. In some examples, the microprocessor 212 can be a System-in-Package (SiP), System-on-Chip (SoC), or the like, which absorbs all or a substantial portion of the functionality of the chipset (e.g., north bridge, south bridge, etc.). The peripheral bus can implement an expansion bus standard, such as Peripheral Component Interconnect Express (PCIe). In the example, the processing system 210 is shown separate from the hardware accelerator 116. In other examples discussed further below, the processing system 210 and the hardware accelerator 116 can be implemented on the same integrated circuit (IC) using a System-On-Chip (SoC).

The system memory 216 is a device allowing information, such as executable instructions and data, to be stored and retrieved. The system memory 216 can include, for example, one or more random access memory (RAM) modules, such as double-data rate (DDR) dynamic RAM (DRAM). The storage device 218 includes local storage devices (e.g., one or more hard disks, flash memory modules, solid state disks, and optical disks) and/or a storage interface that enables the computing system 108 to communicate with one or more network data storage systems. The hardware 204 can include various other conventional devices and peripherals of a computing system, such as graphics cards, universal serial bus (USB) interfaces, and the like.

The hardware accelerator 116 includes a programmable IC 228, a non-volatile memory 224, and RAM 226. The programmable IC 228 can be an FPGA or the like or an SoC having an FPGA or the like. The NVM 224 can include any type of non-volatile memory, such as flash memory or the like. The RAM 226 can include DDR DRAM or the like. The programmable IC 228 is coupled to the NVM 224 and the RAM 226. The programmable IC 228 is also coupled to the peripheral bus 215 of the processing system 210.

The OS 244 can be any commodity operating system known in the art, such as such as Linux®, Microsoft Windows®, Mac OS®, or the like. The acceleration libraries 114 includes drivers and libraries that provide APIs for command and control of the hardware accelerator 116. The applications 112 include software executing on the microprocessor 212 that invokes the APIs of the acceleration libraries 114 to implement neural network(s).

In operation, the programmable IC 228 is configured with an acceleration circuit 230. The acceleration circuit 230 generally includes a base platform 230A and a kernel 230B. For example, the acceleration circuit 230 can be implemented using a static region 234 and a programmable region 236. The static region 234 includes support circuits 240 for providing an interface to the peripheral bus 215, the NVM 224, and the RAM 226. The programmable region 236 can include one or more kernel circuits ("kernel(s) 238"). The base platform 230A is implemented using the static region 234, and the kernel 230B is implemented using the programmable region 236. In another example, the base platform 230A can also be implemented using a portion of the programmable region 236. Thus, in some examples, the programmable region 236 also includes some interface circuits. In some examples, the acceleration circuit 230 can include more than one programmable region 236, each of which can be individually configured with kernel(s) 238.

The static region 234 is "static" in that the circuitry thereof remains constant across reconfigurations of the programmable region 236. In an example, the support circuits 240 include PCIe endpoint circuits, a direct memory access (DMA) controller, interconnects, a memory controller, a memory interface circuit (e.g., a DDR interface), decoupler circuits (to support partial reconfiguration), flash programmer, debug circuits, and the like. In some examples, the programmable region 236 does not include any of the support circuits 240. In other examples, some support circuits are implemented in the programmable region 236. In such case, the programmable region 236 can be referred to as an "expanded programmable region." In either case, in one example, some support circuits 240 are always present in the static region 234, such as the PCIe circuits and the DMA circuits.

Figure 3:
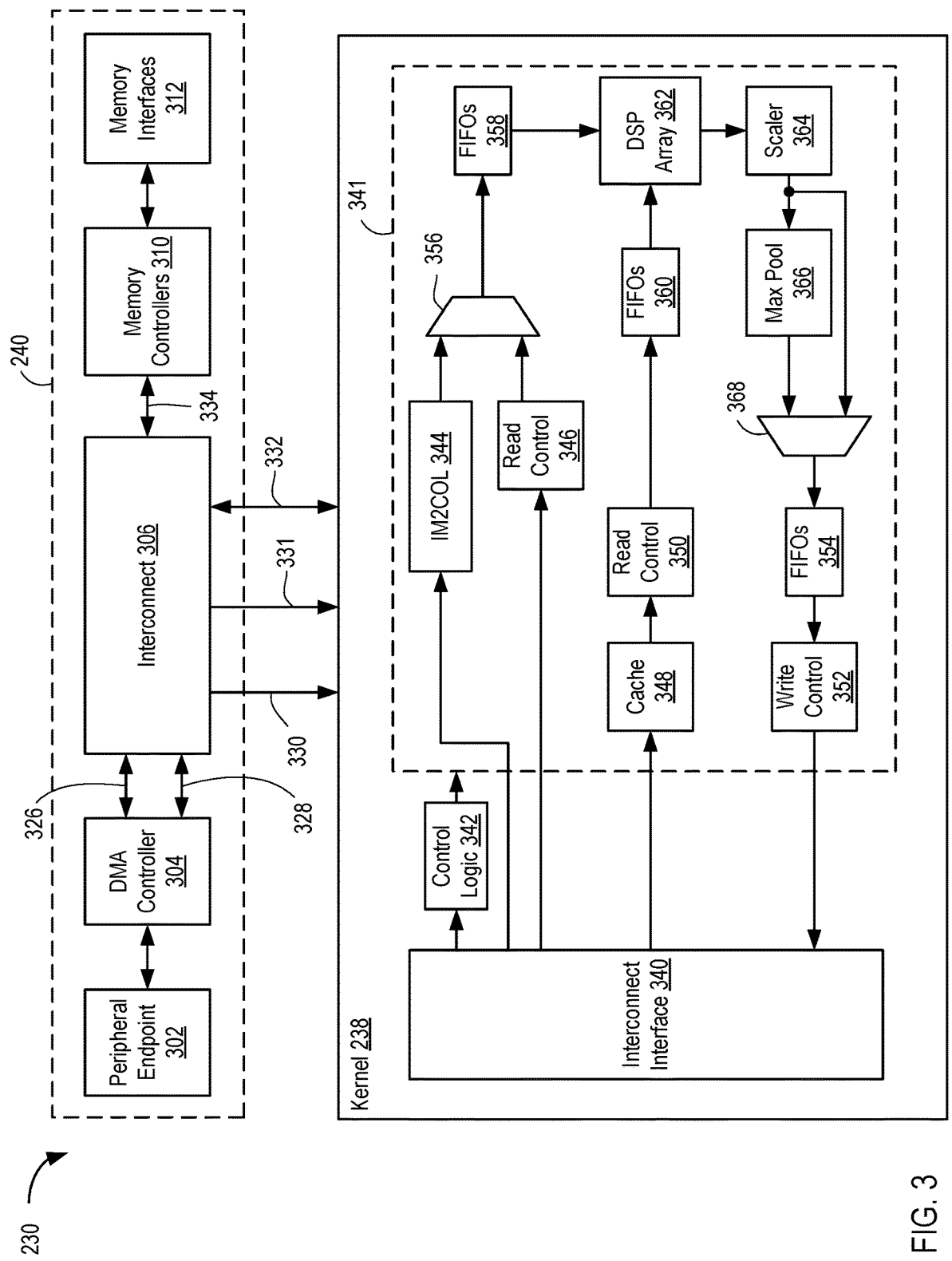
FIG. 3 is a block diagram depicting an acceleration circuit according to an example.

FIG. 3 is a block diagram depicting an acceleration circuit 230 according to an example. The acceleration circuit 230 includes the support circuits 240 and a kernel 238. In the example, the support circuits 240 include a PCIe endpoint circuit ("PCIe endpoint 302"), a PCIe DMA controller 304, interconnect circuits ("interconnect 306"), memory controllers 310, and memory interfaces 312. The support circuits 240 can include other circuits, which are omitted for clarity (e.g., decoupler circuits, debug circuits, etc.). The PCIe endpoint 302 provides a physical interface to the peripheral bus 215. The PCIe DMA controller 304 facilitates DMA operations to the RAM 226 and the kernel 238. The interconnect 306 couples the PCIe DMA controller 304 to the memory controllers 310 and to the kernel 238. The memory controllers 310 are coupled to the memory interfaces 312. The memory interfaces 312 are coupled to the RAM 226.

In operation, the acceleration libraries 246 can access the RAM 226 directly through the PCIe DMA controller 304. The acceleration libraries 246 can also access the kernel 238 through the PCIe DMA controller 304. The kernel 238 can access the RAM 226 through the memory controllers 310.

Data can be exchanged between the software 206 and the kernel 238 using DMA operations between the system memory 216 and the RAM 226.

In the example, the kernel 238 uses interfaces 330, 331, and 332 to communicate with the interconnect 306. In particular, these interfaces include a first read interface 330, a second read interface 331, and a read/write interface 332. For example, the read interface 330 can be used as a control interface for controlling the kernel 238. The read interface 331 can be used to read from the RAM 226 through a first one of the memory interfaces 312. The read/write interface 332 can be used to read and write from the RAM 226 through a second one of the memory interfaces 312.

The kernel 238 includes an interconnect interface 304, control logic 342, and processing circuits 341. The processing circuits 341 include an IM2COL circuit ("IM2COL 344"), a read control circuit ("read control 346"), a multiplexer 356, first-in-first-out circuits ("FIFOs 358"), digital signal processor (DSP) array 362, a scaler circuit ("scaler 364"), a max pool circuit ("max pool 366"), a multiplexer 368, FIFOs 354, write control circuit ("write control 352"), a cache 348, a read control circuit ("read control 350"), and FIFOs 360. The interconnect interface 340 is coupled to the interfaces 330, 331, and 332, the control logic 342, and the processing circuits 341. The interconnect interface 340 can include switches, clock converters, and the like to facilitate communication between the control logic 342 and the interface 330, as well as between the processing circuits 341 and the interfaces 331 and 332.

In the example, the interconnect interface 340 is coupled to inputs of the IM2COL circuit 344, the read control circuit 346, the cache 348, and the write control circuit 352. Outputs of the IM2COL circuit 344 and the read control circuit 346 are coupled to inputs of the multiplexer 356. An output of the multiplexer 356 is coupled to an input of the FIFOs 358. An output of the FIFOs 358 is coupled to a first input of the DSP array 362. An output of the cache 348 is coupled to an input of the read control circuit 350. An output of the read control circuit 350 is coupled to an input of the FIFOs 360. An output of the FIFOs 360 is coupled to a second input of the DSP array 362. An output of the DSP array 362 is coupled to an input of the scaler 364. An output of the scaler 364 is coupled to an input of the max pool circuit 366 and an input of the multiplexer 368. An output of the max pool circuit 366 is coupled to another input of the multiplexer 368. An output of the multiplexer 368 is coupled to an input of the FIFOs 354. An output of the FIFOs 354 is coupled to the write control circuit 352.

In operation, the DSP array 362 performs matrix multiplication operations for implementing a neural network. The inputs of the DSP array 362 receive input activation matrices from the FIFOs 358 and weight matrices from the FIFOs 360. The input activation matrices can be read directly from the RAM 226 using the read control circuit 346. Alternatively, the input activations can be read from the RAM 226 and processed by the IM2COL circuit 344 for input to the DSP array 362. Embodiments of the IM2COL circuit 344 are described below. Weight matrices can be read from the RAM 226 by the read control circuit 350 and cached in cache 348. The scaler 364 can scale the output of the DSP array 362. The max pool circuit 366 can implement a max pooling function on the scaled output of the DSP array 362. In one example, the max pool circuit 966 is implemented using CLBs or other configurable logic. Either the output of the max pool circuit 366 or the scaler 364 can be stored in the FIFOs 354. The write control circuit 352 writes data in the FIFOs to the RAM 226. The control logic 342 controls the various circuits in the processing circuits 341, such as the IM2COL circuit 344, the read control circuit 346, the multiplexers 356 and 368, the read control circuit 350, and the scaler 364, the max pool circuit 366, and the write control circuit 352.

Figure 4:
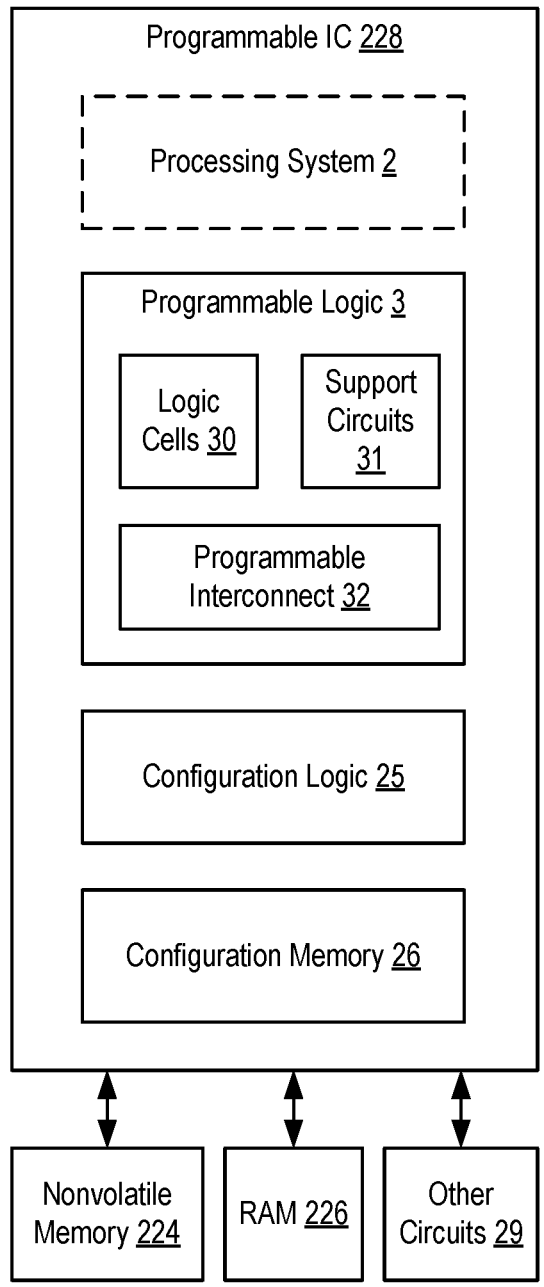
FIG. 4 is a block diagram depicting a programmable integrated circuit (IC) according to an example.

FIG. 4 is a block diagram depicting a programmable IC 228 according to an example. The programmable IC 228 includes programmable logic 3, configuration logic 25, and configuration memory 26. The programmable IC 228 can be coupled to external circuits, such as the NVM 224, the RAM 226, and other circuits 29. The programmable logic 3 includes logic cells 30, support circuits 31, and programmable interconnect 32. The logic cells 30 include circuits that can be configured to implement general logic functions of a plurality of inputs. The support circuits 31 include dedicated circuits, such as transceivers, input/output blocks, digital signal processors, memories, and the like. The logic cells and the support circuits 31 can be interconnected using the programmable interconnect 32. Information for programming the logic cells 30, for setting parameters of the support circuits 31, and for programming the programmable interconnect 32 is stored in the configuration memory 26 by the configuration logic 25. The configuration logic 25 can obtain the configuration data from the nonvolatile memory 224 or any other source (e.g., the DRAM 28 or from the other circuits 29). In some examples, the programmable IC 228 includes a processing system 2. The processing system 2 can include microprocessor(s), memory, support circuits, IO circuits, and the like. For example, the processing system 2 can include circuits similar to the processing system 210. In some examples, the processing system 2 can be used in place of the processing system 210. In such case, the entire computing system 108 can be implemented using the programmable IC 228, where the software 206 executes on the processing system 2.

Figure 5:
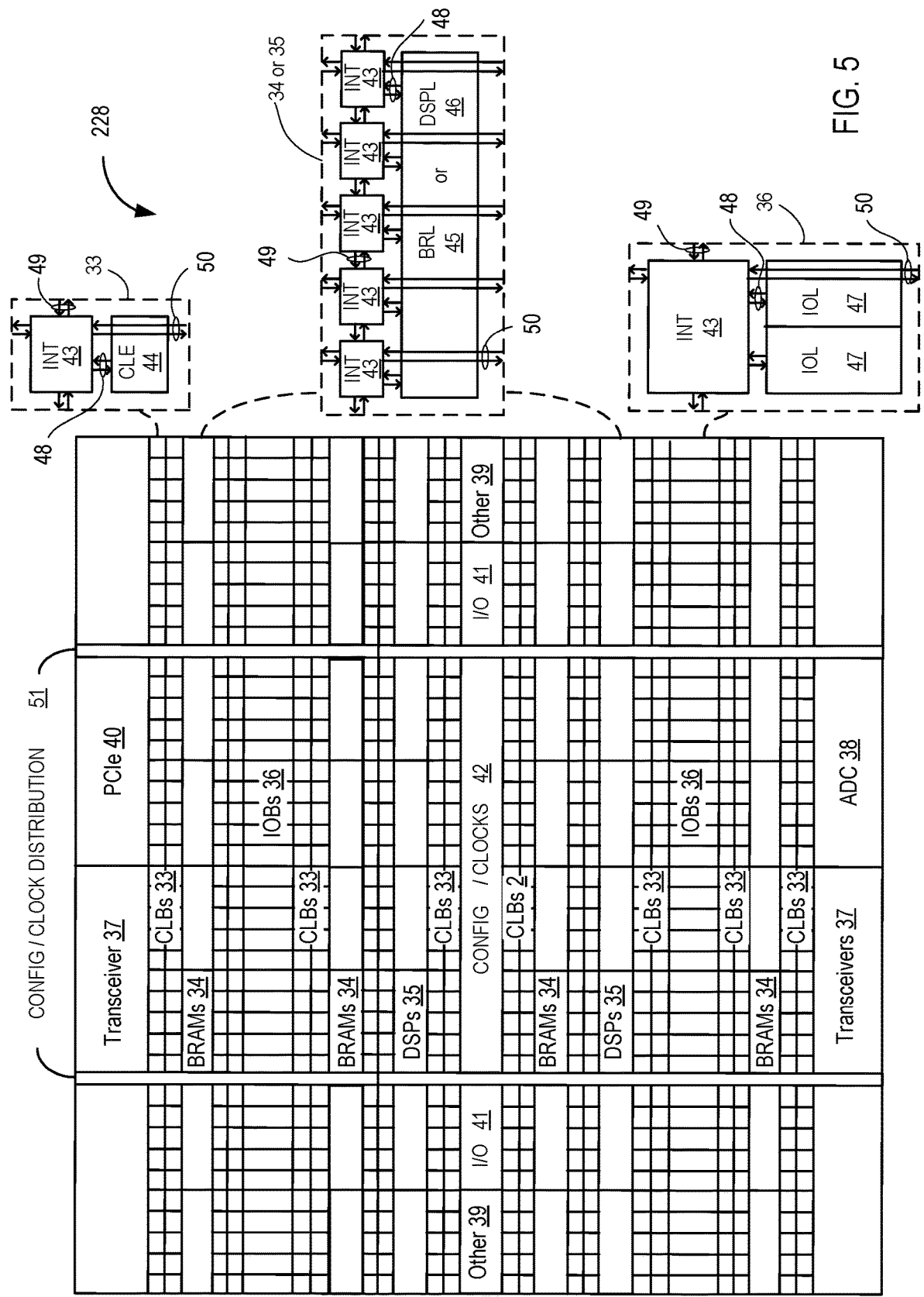
FIG. 5 illustrates a field programmable gate array (FPGA) implementation of a programmable IC according to an example.

FIG. 5 illustrates an FPGA implementation of the programmable IC 228 that includes a large number of different programmable tiles including transceivers 37, configurable logic blocks ("CLBs") 33, random access memory blocks ("BRAMs") 34, input/output blocks ("IOBs") 36, configuration and clocking logic ("CONFIG/CLOCKS") 42, digital signal processing blocks ("DSPs") 35, specialized input/output blocks ("I/O") 41 (e.g., configuration ports and clock ports), and other programmable logic 39 such as digital clock managers, analog-to-digital converters, system monitoring logic, and so forth. The FPGA can also include PCIe interfaces 40, analog-to-digital converters (ADC) 38, and the like.

In some FPGAs, each programmable tile can include at least one programmable interconnect element ("INT") 43 having connections to input and output terminals 48 of a programmable logic element within the same tile, as shown by examples included at the top of FIG. 5. Each programmable interconnect element 43 can also include connections to interconnect segments 49 of adjacent programmable interconnect element(s) in the same tile or other tile(s). Each programmable interconnect element 43 can also include connections to interconnect segments 50 of general routing resources between logic blocks (not shown). The general routing resources can include routing channels between logic blocks (not shown) comprising tracks of interconnect segments (e.g., interconnect segments 50) and switch blocks (not shown) for connecting interconnect segments. The interconnect segments of the general routing resources (e.g., interconnect segments 50) can span one or more logic blocks. The programmable interconnect elements 43 taken together with the general routing resources implement a programmable interconnect structure ("programmable interconnect") for the illustrated FPGA.

In an example implementation, a CLB 33 can include a configurable logic element ("CLE") 44 that can be programmed to implement user logic plus a single programmable interconnect element ("INT") 43. A BRAM 34 can include a BRAM logic element ("BRL") 45 in addition to one or more programmable interconnect elements. Typically, the number of interconnect elements included in a tile depends on the height of the tile. In the pictured example, a BRAM tile has the same height as five CLBs, but other numbers (e.g., four) can also be used. A DSP tile 35 can include a DSP logic element ("DSPL") 46 in addition to an appropriate number of programmable interconnect elements. An IOB 36 can include, for example, two instances of an input/output logic element ("IOL") 47 in addition to one instance of the programmable interconnect element 43. As will be clear to those of skill in the art, the actual I/O pads connected, for example, to the I/O logic element 47 typically are not confined to the area of the input/output logic element 47.

In the pictured example, a horizontal area near the center of the die (shown in FIG. 8) is used for configuration, clock, and other control logic. Vertical columns 51 extending from this horizontal area or column are used to distribute the clocks and configuration signals across the breadth of the FPGA.

Some FPGAs utilizing the architecture illustrated in FIG. 5 include additional logic blocks that disrupt the regular columnar structure making up a large part of the FPGA. The additional logic blocks can be programmable blocks and/or dedicated logic.

Note that FIG. 5 is intended to illustrate only an exemplary FPGA architecture. For example, the numbers of logic blocks in a row, the relative width of the rows, the number and order of rows, the types of logic blocks included in the rows, the relative sizes of the logic blocks, and the interconnect/logic implementations included at the top of FIG. 5 are purely exemplary. For example, in an actual FPGA more than one adjacent row of CLBs is typically included wherever the CLBs appear, to facilitate the efficient implementation of user logic, but the number of adjacent CLB rows varies with the overall size of the FPGA.

Image Preprocessing for Generalized Image Processing

Figure 6:
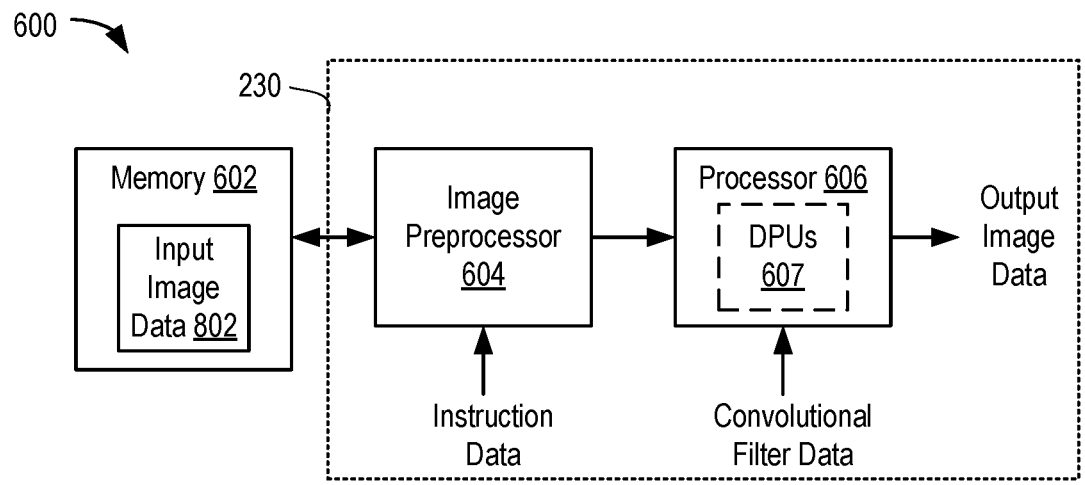
FIG. 6 is a block diagram depicting a convolution processor according to an example.

FIG. 6 is a block diagram depicting a convolution processor 600 according to an example. The convolution processor 600 includes a memory 602, an image preprocessor 604, and a processor 606. The image preprocessor 604 and the processor 606 can be implemented in the acceleration circuit 230 described above. For example, the processor 606 can be the DSP array 362. The image preprocessor 604 can be the image preprocessor 344. The memory 602 can be the RAM 226 in the hardware accelerator 116. An example structure of the image preprocessor 604 is described below with respect to FIG. 7. In other examples, the convolution processor 600 can be implemented in acceleration circuits or other types of circuits having different structures than shown in FIG. 3.

In operation, the memory 602 stores input image data 802. Example input image data 802 is described below with respect to FIG. 8A. In general, the input image data 802 includes images, where each image is a two-dimensional array of samples. The image preprocessor 604 receives instruction data from an external circuit (e.g., the control logic 342). In response to the instruction data, the image preprocessor 604 obtains blocks of the image data 802 from the memory 602 and formats the image blocks into a plurality of parallel streams of image samples ("sample streams"). The image samples in each stream are ordered based on convolution parameters, including filter size, stride, and dilation. Convolution of image data is described briefly below, including the concepts of stride and dilation. The processor 606 receives the sample streams and convolutional filter data. The processor 606 performs operations resulting in convolution of the input image data 802 and the convolutional filter data. The processor 606 generates output image data as a result of the processing.

In an example, the processor 606 includes a systolic array of data processing units (DPUs) 607. As described further below, convolution can be performed using matrix multiplication. The DPUs 607 execute multiply-accumulate operations based on the sample streams and the filter data to generate the output image data. In other examples, the processor 606 can be a vector processor having one or more cores that process the sample streams and the filter data as vectors. In still other examples, the image preprocessor 604 can be coupled to other consumers of the image sample streams in addition to the processor 606 or as an alternative to the processor 606 (e.g., stored in a memory for later processing). In other examples, the processor 606 can perform other operations in place of convolution (e.g., filtering operations). In general, the image preprocessor 604 generates streams of image samples having certain sample patterns needed by the consumer of the image samples to perform particular operations.

Figure 7:
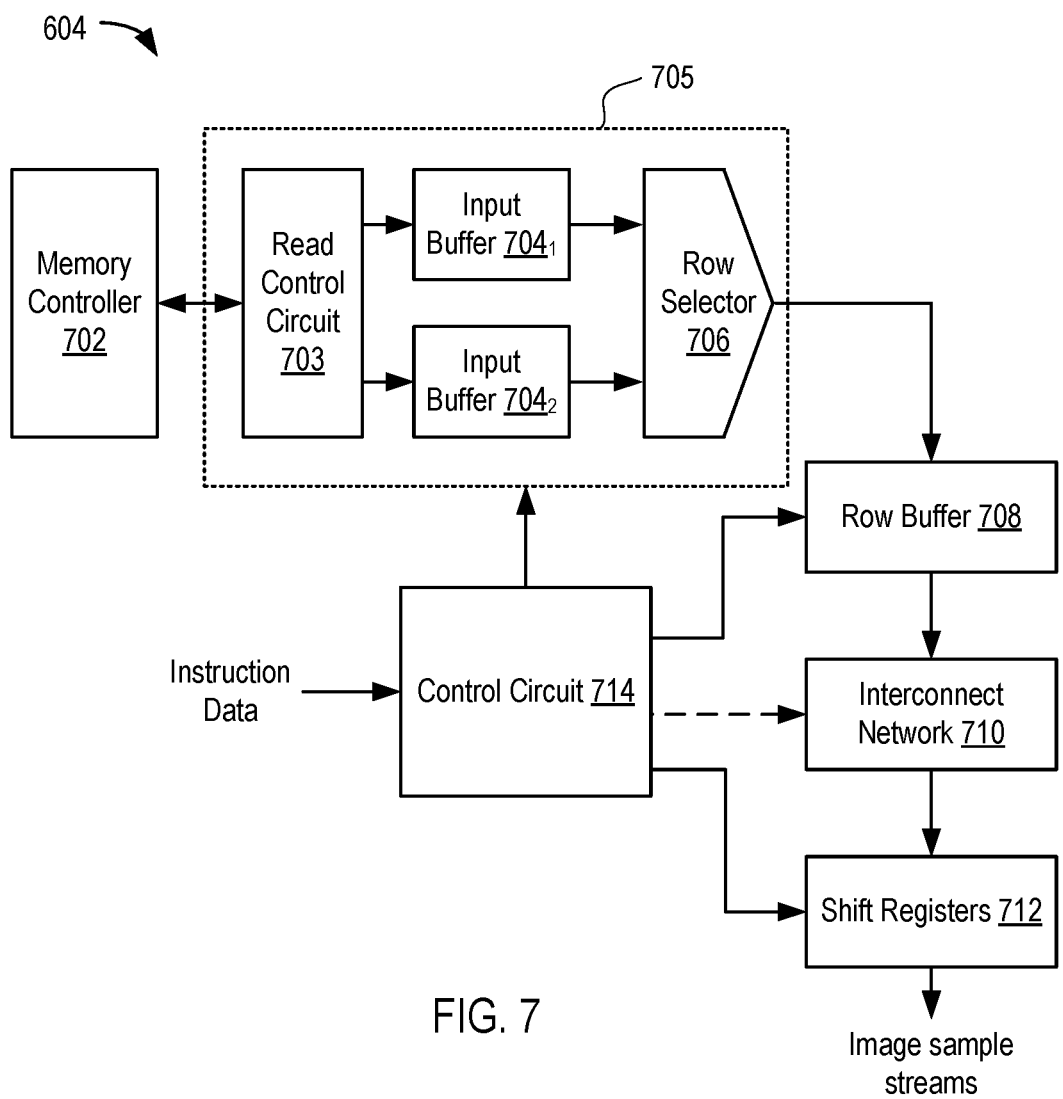
FIG. 7 is a block diagram depicting an image preprocessor according to an example.

FIG. 7 is a block diagram depicting the image preprocessor 604 according to an example. The image preprocessor 604 includes an input buffer circuit ("input buffer 705"), a row buffer circuit ("row buffer 708"), an interconnect network 710, shift register circuits ("shift registers 712"), and a control circuit 714. The image preprocessor 604 can include a memory controller 702. Alternatively, the memory controller 702 can be implemented external to the image preprocessor 604 (e.g., part of the memory controllers 310 shown in FIG. 3). The control circuit 714 can be coupled to other control circuits external to the image preprocessor 604 (e.g., the control logic 342 shown in FIG. 3).

In an example, the input buffer 705 includes a read control circuit 703, an input buffer $704_1$, an input buffer $704_2$, and a row selector 706. The read control circuit 703 is coupled between the memory controller 702 and the input buffers $704_1$ and $704_2$. The row selector 706 is coupled between the input buffers $704_1$ and $704_2$ and the row buffer 708. In operation, the read control circuit 703 sends address and command data to the memory controller 702 to obtain image data from the memory 602. Each input buffer $704_1$ and $704_2$ is configured to store a block of image data having a plurality of rows. In the example, the input buffer 705 double-buffers the image data such that the read control circuit 703 loads one input buffer $704_1$ or $704_2$ while the row selector 706 reads from the other input buffer $704_1$ or $704_2$. The input buffer 705 can include different structures than what is shown in FIG. 7 (e.g., the input buffer 705 can be a single buffer or implement more than double buffering). In general, the input buffer 705 stores block(s) of image data having a number of image rows for loading into the row buffer 708.

The row buffer 708 includes a plurality of storage locations. For example, the row buffer 708 can include a plurality of registers each configured to store a respective sample of a row of the image data. The row buffer 708 includes enough storage locations to store a row of the image data. The samples stored in the row buffer 708 are loaded into the shift registers 712 through the interconnect network 710. Each shift register 712 accesses a different pattern of the storage locations of the row buffer 708 to generate an image sample stream. The interconnect network 710 includes a connection between each shift register 712 and a particular pattern of the storage locations in the row buffer 708. As described further below, the patterns of storage locations coupled to the shift registers 712 can be overlapping and can be non-consecutive depending on filter width, stride, and dilation of the convolution operation being performed. Different filter widths, strides, and dilations result in different access patterns between the row buffer 708 and the shift registers 712.

In an example, the interconnect network 710 supports a single access pattern for each shift register 712. In such an example, the interconnect network 710 only includes wires to implement the connections. In other examples, the interconnect network 710 supports multiple access patterns for each shift register 712. In such examples, the interconnect network 710 can include multiplexers to select among different connections that implement the different access patterns. The shift registers 712 output the image sample streams to be consumed by other circuitry (e.g., the processor 606).

The control circuit 714 is coupled to the input buffer 705, the row buffer 708, and the shift registers 712. The control circuit 714 also includes an instruction input. The control circuit 714 can receive instructions from external control logic (e.g., the control logic 342). The control circuit 714 can provide enable signals, clock signals, and the like to each of the input buffer 705, the row buffer 708, and the shift registers 712 to perform the operations described herein. The instruction input can provide address data for obtaining the image data from the memory 602. The control circuit 714 can provide the address data to the read control circuit 703. The control circuit 714 provides a row clock to the row buffer 708 for loading the storage locations therein with a row of the image data. The control circuit 714 provides a sample clock to the shift registers 712 for shifting out image samples. In an example, the control circuit 714 can also be coupled to the interconnect network 710 (e.g., when the interconnect network 710 includes multiplexers). The control circuit 714 can provide a mode select signal to the multiplexers in the interconnect network 710 to select which access pattern is to be used for each shift register 712.

Figure 8A:
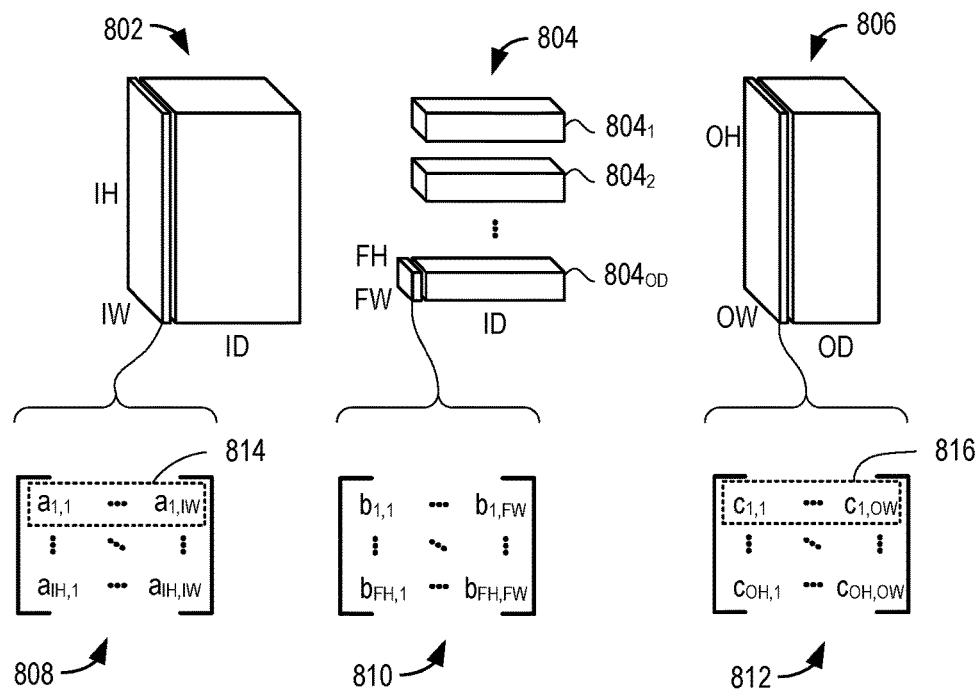
FIG. 8A illustrates input image data, filter data, and output image data for a convolution operation according to an example.

FIG. 8A illustrates input image data 802, filter data 804, and output image data 806 for a convolution operation according to an example. The convolution operation can be performed for a particular layer of a CNN, for example. The input image data 802 includes two-dimensional images, each having a width (IW) and a height (IH), for each of a number of channels (ID). Thus, the input image data 802 comprises an IW×IH×ID volume of image samples. For example, the input image data 802 can include 227×227 images in each of red, green, and blue (RGB) channels (e.g., 227×227×3). In another example, an inner convolutional layer of a CNN can include input image data with dimensions 55×55×96 (e.g., 96 channels each having a 55×55 image). Each image 808 can be represented by a two-dimensional matrix $A=(a_{ij})_{IH \times IW}$. Each image 808 includes an IH number of rows 814. As described below, the image preprocessor 604 processes an image 808 on a row-by-row basis.

In some cases, each image 808 can be padded with columns of zero-value samples on the left and right edges and/or rows of zero-value samples on the top and bottom edges. Padding is represented by numbers PH and PW, where PH is padding height and PW is padding width. For example, PH=PW=0 is no padding; PH=PW=1 means a ring of zero-value samples surrounds the image samples; PH=1 means that one row of zero-value samples is added to the top edge and another row of zero-value samples is added to the bottom edge; and PW=2 means that two columns of zero-value samples are added to the right edge and another two columns of zero-value samples are added to the left edge.

The filter data 804 includes three-dimensional filters $804_1 \ldots 804_{OD}$, each having a width (FW), a height (FH), and the depth (ID). Each three-dimensional filter $804_1 \ldots 804_{OD}$ is convolved with the input image data 802 to generate a respective channel of the output image data 806. Thus, the number of three-dimensional filters $804_1 \ldots 804_{OD}$ equals the depth (OD) of the output image. Also, the depth of each three-dimensional filter $804_1 \ldots 804_{OD}$ matches the depth (ID) of the input image data 802. For example, a convolutional layer of a CNN can include 96 three-dimensional filters having dimensions of 11×11×3. Each two-dimensional cross-section of a filter $804_1 \ldots 804_{OD}$ can be represented by a two-dimensional matrix $B=(b_{ij})_{FH \times FW}$.

The output image data 806 includes two-dimensional images, each having a width (OW) and a height (IH), for a number (OD) of channels. Thus, the output image data 806 forms an OW×OH×OD volume. For example, the output image data 806 can include 96 channels each having a 55×55 image. Each image 816 can be represented by a two-dimensional matrix $C=(c_{ij})_{OH \times OW}$. Each image 816 includes an OH number of rows.

The values of OH and OW depend on the filter dimensions (FH, FW), input image padding (PH, PW), horizontal stride ($S_h$), vertical stride ($S_v$), horizontal dilation ($D_h$), and vertical dilation ($D_v$). Notably, $$OH = \left\lfloor \frac{IH + 2 \cdot PH - ((D_v + 1) \cdot (FH - 1) + 1)}{S_v} \right\rfloor + 1 \text{ and}$$

$$OW = \left\lfloor \frac{IW + 2 \cdot PW - ((D_h - 1) \cdot (FW - 1) + 1)}{S_h} \right\rfloor + 1.$$

To ensure that the entire image is processed, the expression $(IH+2PH-((D_v+1)(FH-1)+1))$ should evaluate to be a multiple of $S_v$ and the expression $(IW+2PW-((D_h+1)(FW-1)+1))$ should evaluate to be a multiple of $S_h$.

An output sample in an output image 812 depends on a neighborhood of input samples in each input image 808 referred to herein as a "receptive field." Each receptive field includes FH×FW input samples. A given output sample $c_{ij}$ in the output image 812 is computed by taking the dot product between vector of its receptive fields and a vector of given filter. Thus, the receptive fields of a given output sample $c_{ij}$ include a volume of input samples equal to ID×FH×FW samples. The size of the receptive fields depends on the filter dimensions (FH, FW). The input samples of the receptive fields and the extent to which the receptive fields overlap one another depend on the stride and dilation parameters of the convolution and the padding of the input image data.

Figure 8B:
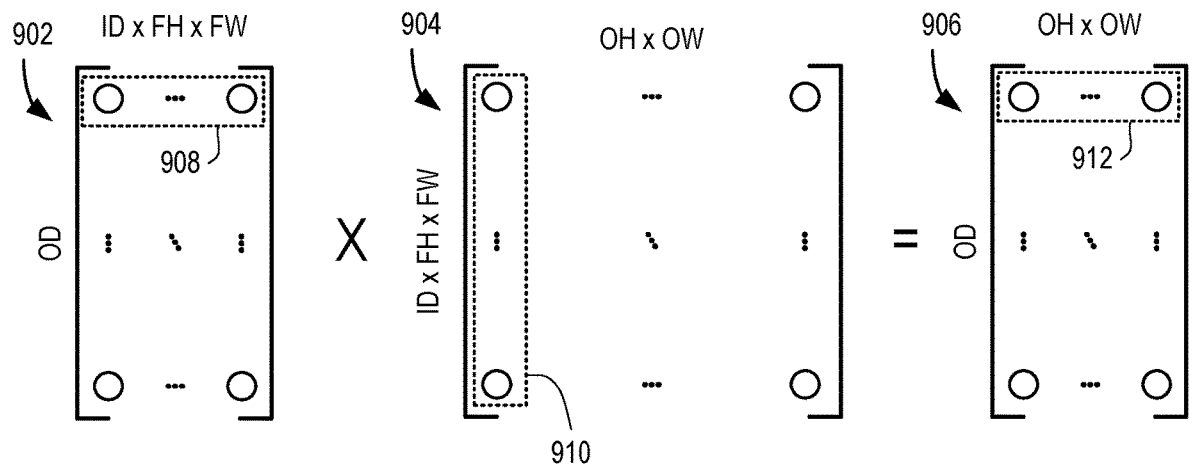
FIG. 8B illustrates convolution in terms of a two-dimensional matrix multiplication operation.

FIG. 8B illustrates convolution in terms of a two-dimensional matrix multiplication operation. A filter matrix 902 has an OD number of rows and an (ID×FH×FW) number of columns. In the filter matrix 902, each of the filters $804_1 \ldots 804_{OD}$ is converted into a vector having an (ID×FH×FW) number of elements. Each "vectorized" filter becomes a row 908 of the filter matrix 906.

An output image matrix 906 has an OD number of rows and an (OH×OW) number of columns. Each row 912 of the output image matrix 906 is a vectorized form of an output image 812. The output image matrix 906 includes an OD number of rows representing an OD number of channels of the output image data 806.

An input image matrix 904 has ID×FH×FW number of rows and OH×OW number of columns. The input image matrix 904 is formed so that each column 910 includes the receptive fields for a given output sample. Thus, the input image matrix 904 depends on filter size (FH, FW) and padding (PH, PW), as well as stride and dilation selected for the convolution.

In one technique, a processor can perform convolution by generating the matrices 902, 904, and 906 and performing the matrix multiplication operation. However, such a technique requires generation of the large input image matrix 904 using an image-to-column (IM2COL) process. The input image matrix 904 includes redundant data (e.g., image samples are repeated across the columns according to a particular pattern according to the defined overlap of receptive fields). For example, consider an input image data having 227×227×3 image samples (e.g., RGB image having height and width of 227 pixels each without padding). Assume further an 11×11×3 filter and a stride of four. In such an example, the input image data 802 includes 154,587 image samples, but the input image matrix 904 includes 1,098,075 image samples. If each image sample is one byte, generation of the input image matrix 904 requires approximately 1 MB of temporary storage. Of course, larger input sample sizes require even more temporary storage. Furthermore, computation of the input image matrix 904 requires complete traversal of the input image data 802 prior to performing the convolution operation. As described further herein, the image preprocessor 604 avoids the need to compute the input image matrix 904 and thus requires significantly less memory resources. Further, the image preprocessor 604 formats the input image data 802 in parallel with computation of the convolution.

Figure 9:
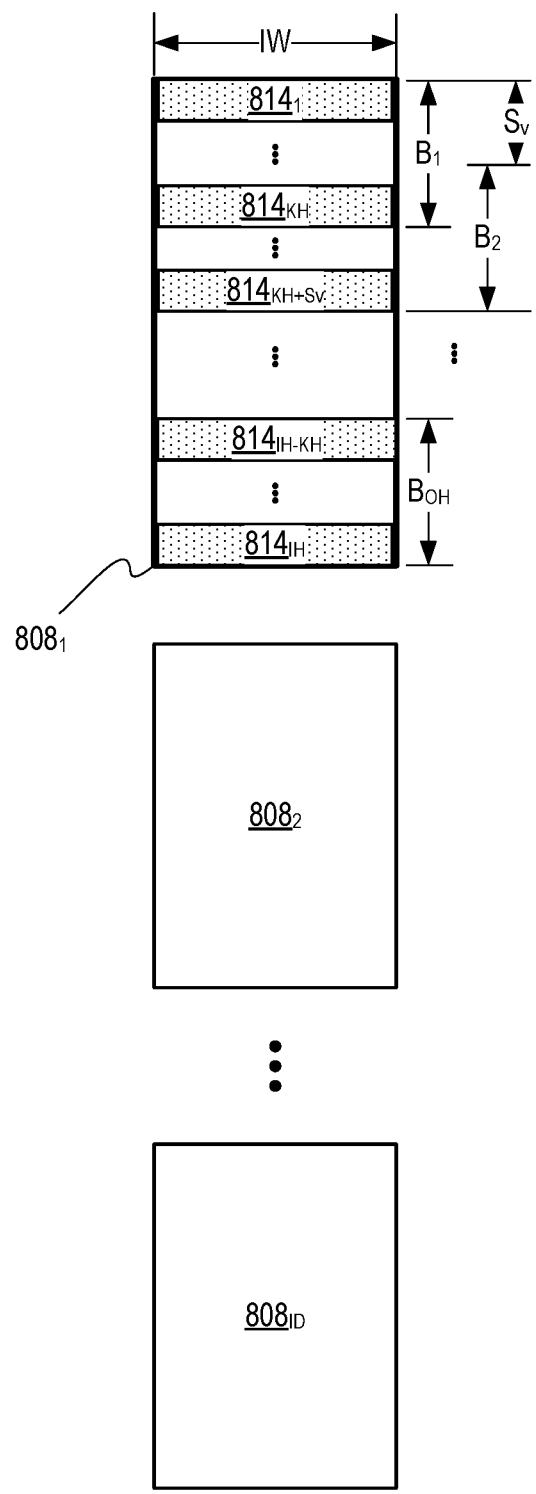
FIG. 9 illustrates a method of processing input image data by the image preprocessor of FIG. 7 according to an example.

FIG. 9 illustrates a method of processing the input image data 802 by the image preprocessor 604 according to an example. As described in the example above, the input image data 802 includes a plurality of images 802 (e.g., images $802_1 \ldots 802_{ID}$). The input image data 802 can be stored in the memory 602 in row-major format. The input buffer 705 reads the input image data 802 a block at a time. In an example, each block of image data includes a KH number of rows 814. In the example of FIG. 7, the input buffer 705 double-buffers the input image data. Thus, at the start of preprocessing, the read control circuit 703 loads the input buffer 704$_1$ with a block $B_1$ that includes rows $814_1 \ldots 814_{KH}$ of the image $808_1$. The read control circuit 703 determines the vertical stride ($S_v$) (e.g., received from the control circuit 714) and loads the input buffer 704$_2$ with a second block $B_2$, which includes rows $814_{S_v} \ldots 814_{KH+S_v}$.

The row selector 706 loads the row buffer 708 with a row of image data from the buffer 704$_1$ while the read control circuit 703 loads the block $B_2$ into the input buffer 704$_2$. The row selector 706 loads the row buffer 708 according to a row clock (e.g., generated by the control circuit 714). The row selector 706 traverses through KH rows in the input buffer 704$_1$ before switching to reading from the input buffer 704$_2$. Upon switching to the input buffer 704$_2$, the read control circuit 703 loads new rows from a block $B_3$ (not explicitly shown) into the input buffer 704$_1$. Note that, depending on the vertical stride ($S_v$), the read control circuit 703 may read less than KH rows for updating the input buffer 704$_1$ with the block $B_3$ and any subsequent block in the image $808_1$. The block $B_3$ may include rows common with the block $B_1$ and thus only the new rows are added to the input buffer 704$_1$. For example, if KH=11 and $S_v$=4, then the first three rows of the block $B_3$ (e.g., rows $814_9 \ldots 814_{11}$) are the last three rows of the block $B_1$ and can be reused. The same holds true for each subsequent odd numbered block stored in the input buffer 704$_1$. Likewise, the same holds true for each even numbered block stored in the input buffer 704$_2$ after the block $B_2$. In general, after the first two blocks $B_1$ and $B_2$, the read control circuit 703 reads MIN(KH, 2*$S_v$) rows into either the input buffer 704$_1$ or the input buffer 704$_2$. As is further shown in FIG. 9, the read control circuit 703 reads an OH number of blocks per input image 808 ($B_1 \ldots B_{OH}$).

In the example of FIG. 9, it is assumed that the input buffers 704$_1$ and 704$_2$ have a height of KH. In some examples, the input buffers 704$_1$ and 704$_2$ can store more than a KH number of rows. For example, if the image preprocessor 604 is configured to support multiple modes, then the input buffers 704$_1$ and 704$_2$ can store a number of rows greater than or equal to the largest KH of the multiple modes. If the input buffers 704$_1$ and 704$_2$ can store more than KH rows, then the blocks can be larger than KH in height. This results in fewer rows needing to be read from the memory 602 to update the buffers in subsequent cycles.

In the example of FIG. 9, it is assumed that one input image 808 is processed row-by-row with a row width of IW. The input buffers 704$_1$ and 704$_2$ and the row buffer 708 may be capable of storing more than IW number of image samples. For example, consider a case where the image preprocessor 604 is configured to support convolution for each convolutional layer of the AlexNet CNN. In the first convolutional layer, the input images are 227×227 in height and width. In the second convolutional layer, the input images are 55×55 in height and width. In the third convolutional layer, the input images are 27×27 in height and width. In the fourth and fifth convolutional layers, the input images are 13×13. The input buffers 704$_1$ and 704$_2$ and the row buffer 708 can be configured to store at least 227 image samples to support the first convolutional layer. For convolutional layers after the first layer, the input images may be stored in the memory 602 in an interleaved manner so that the "image" being processed by the image preprocessor 604 has rows that are a concatenation of rows (e.g., a concatenation of two 55 sample rows, a concatenation of four 27 sample rows, etc.).

In the example of FIG. 9, it is assumed that the vertical dilation ($D_v$) is zero (i.e., no dilation). If the vertical dilation is nonzero, then each block $B_1 \ldots B_{OH}$ still includes a KH number of rows, but the row indexes would be different depending on the amount of dilation. For example, if the vertical dilation ($D_v$) is set to one, then the block $B_1$ includes rows $804_1, 804_3, 804_5, \ldots, 804_{2KW-1}$. The block $B_2$ includes rows $804_5, 804_7, 804_9, \ldots, 804_{2KW-1+S_v}$.

Figure 10:
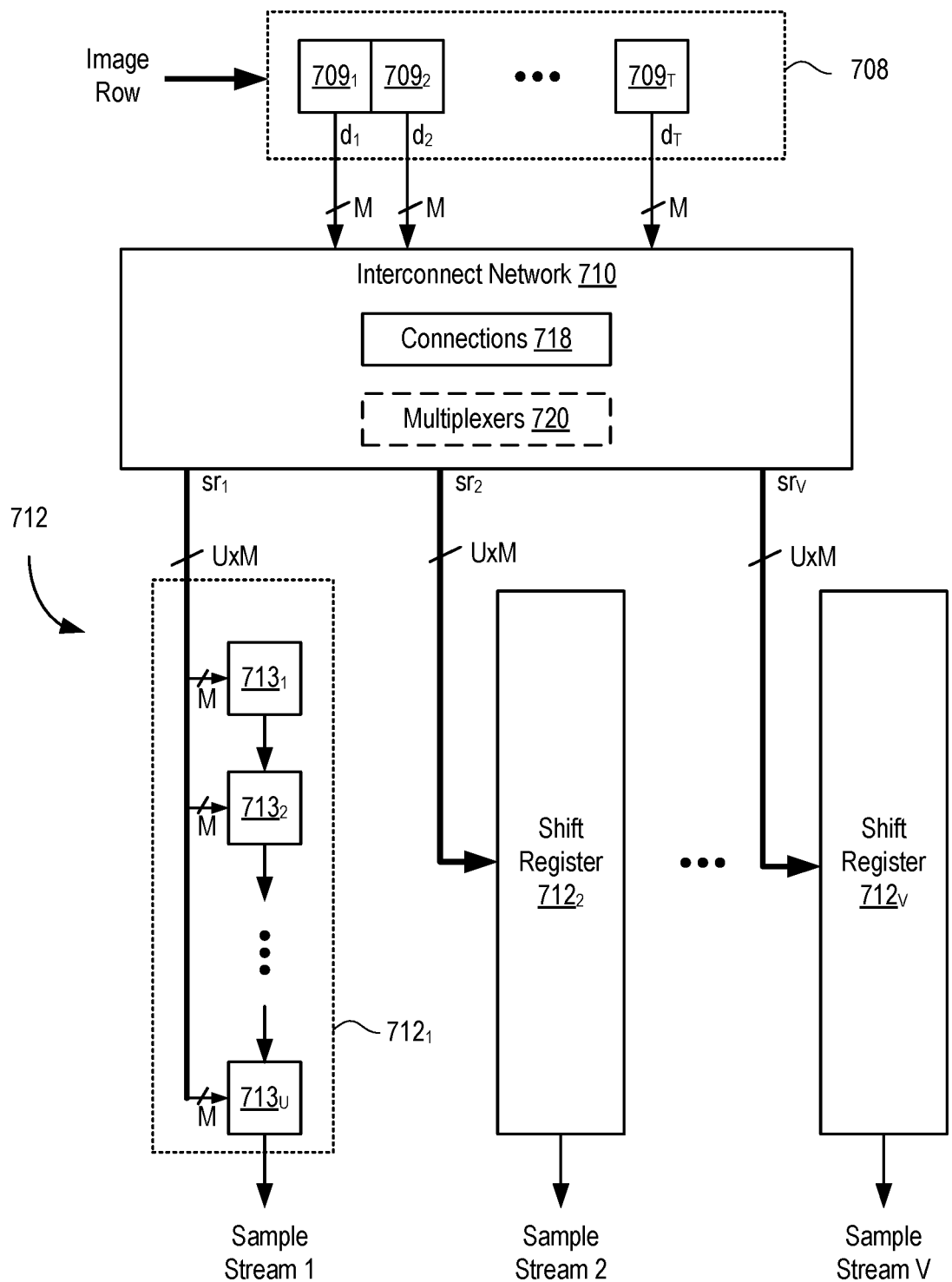
FIG. 10 is a block diagram depicting the image preprocessor of FIG. 7 in more detail according to an example.

FIG. 10 is a block diagram depicting the processor 606 in more detail according to an example. The row buffer 708 includes storage locations (e.g., registers) $709_1 \ldots 709_T$, where T is a positive integer. The number T can be selected to support at least the largest IW of the CNN (e.g., T>=227 for an AlexNet CNN). Each storage location 709 stores an M-bit image sample (e.g., M=8, M=16, etc.). Each storage location 709 is accessible via a respective output $d_1 \ldots d_T$ of the row buffer 708. Each output $d_1 \ldots d_T$ is an M-bit output.

The shift registers 712 include shift registers $712_1 \ldots 712_V$, where V is positive integer. The number V can be selected to support the at least the largest OW of the CNN (e.g., V>=55 for an AlexNet CNN) or an integer multiple of smaller OW values. This allows the image preprocessor 604 to feed the processor 606 with image data needed for an entire row of the output image. Each shift register 712 includes storage locations (e.g., registers) $713_1 \ldots 713_U$, where U is a positive integer. In an example, the number U is selected to support at least the largest filter width (FW) (e.g., U=11 for an AlexNet CNN). Each storage location 713 stores an M-bit image sample. The storage locations 713 are loaded in parallel from a respective input $sr_1 \ldots sr_V$. Each input $sr_1 \ldots sr_V$ has a width of U×M to support parallel loading of the storage locations 713 in a respective shift register $712_1 \ldots 712_V$. Each shift register 712 outputs a stream of M-bit image samples. Thus, the image preprocessor 604 generates V sample streams respectively output by the shift registers $712_1 \ldots 712_V$.

The interconnect network 710 is disposed between the outputs $d_1 \ldots d_T$ and the inputs $sr_1 \ldots sr_V$. The interconnect network 710 includes connections 718 and, optionally, multiplexers 720. In an example, the interconnect network 710 supports a single mode (e.g., one access pattern of the row buffer 708). In such case, the multiplexers 720 are omitted. Each connection 718 couples an input $sr_i$ to a different pattern of the outputs $d_1 \ldots d_T$. In an example, the different patterns overlap based on a selected filter size, horizontal stride, and horizontal dilation. In another example, the interconnect network 710 supports multiple modes (e.g., multiple access patterns of the row buffer 708). In such case, the network 715 includes the multiplexers 720. An output of each multiplexer 720 is coupled to a respective output $sr_1 \ldots sr_V$. Inputs of the multiplexers 720 are coupled to connections 718. For each multiplexer 720, each input is connected to a different set of the inputs $d_1 \ldots d_T$ based on different access patterns. Example structures of the interconnect network 710 are described further below.

Figure 11:
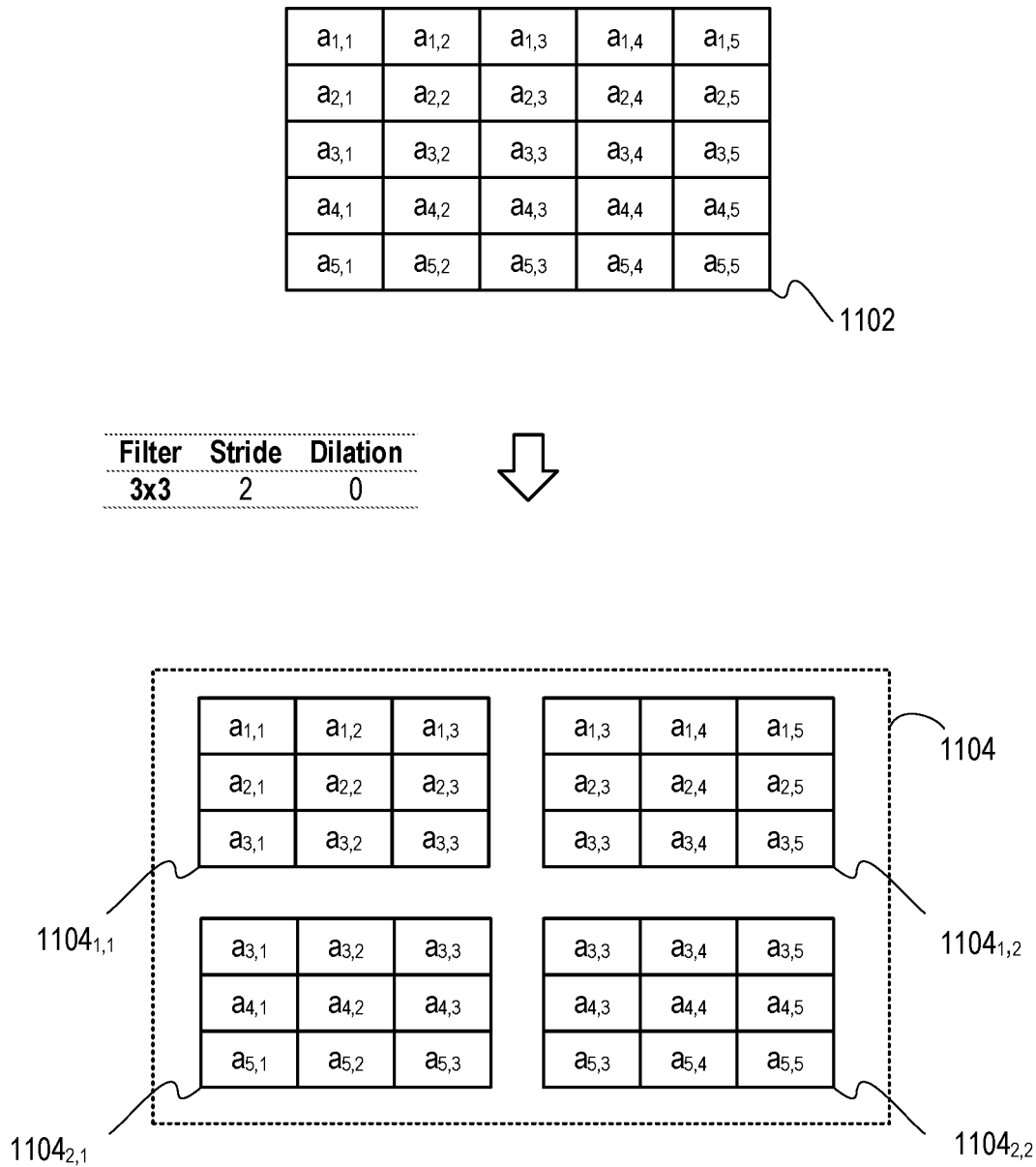
FIG. 11 illustrates an example input image and a set of receptive fields.

FIG. 11 illustrates an example input image 1102 and a set of receptive fields 1104. The input image 1102 has an IW of 5 and an IH of 5 (i.e., a 5×5 image). The image 1102 is defined by a matrix $A=(a_{ij})_{5\times 5}$, where each $a_{ij}$ is an input sample. In the present example, the parameters of convolution include filter dimensions (FH, FW) of 3×3, a horizontal stride ($S_h$) of 2, and a horizontal dilation ($D_h$) of 0. With such parameters, the height of the output image (OH) and the width of the output image (OW) are both two (i.e., OH=OW=2). The output image is defined by a matrix $C=(c_{ij})_{2\times 2}$, where each $c_{ij}$ is an output sample (not explicitly shown in FIG. 11). The output sample $c_{1,1}$ has a receptive field $1104_{1,1}$, which includes input samples in the first three rows and first three columns of the input image 1102. The output sample $c_{1,2}$ has a receptive field $1104_{1,2}$, which includes input samples in the first three rows and the last three columns of the input image 1102. The output sample $c_{2,1}$ has a receptive field $1104_{2,1}$, which includes input samples in the last three rows and the first three columns. The output sample $c_{2,2}$ has a receptive field $1104_{2,2}$, which includes input samples in the last three rows and last three columns.

Figure 12A:
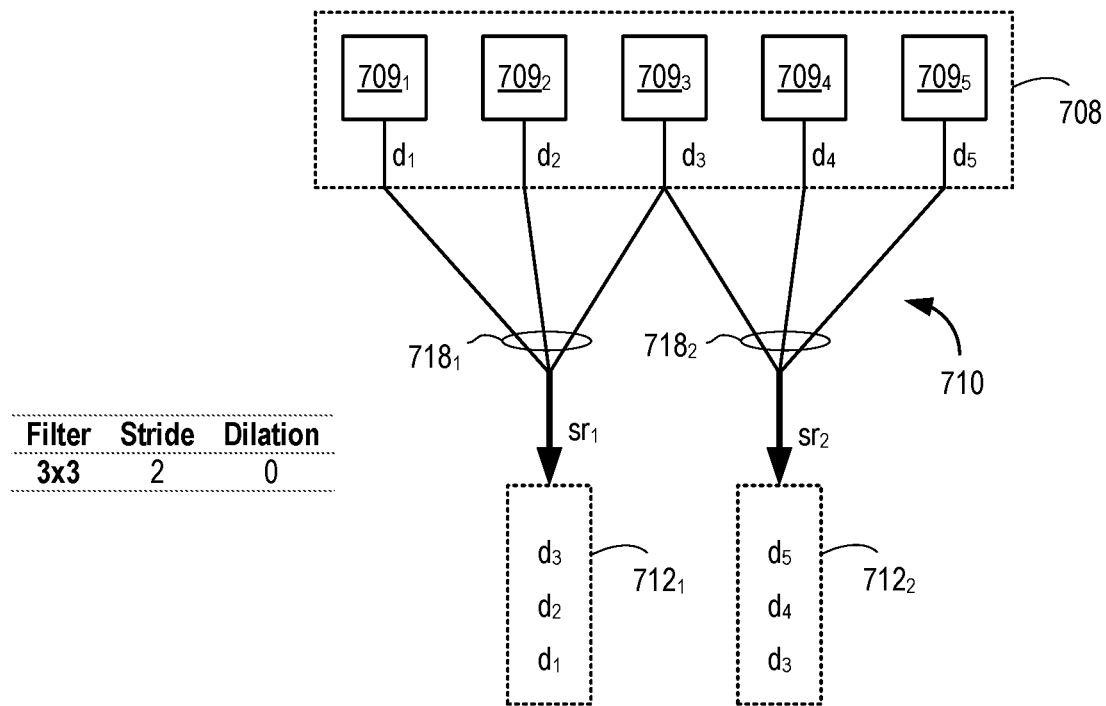
FIG. 12A is a block diagram depicting a configuration of an interconnect network according to an example.

FIG. 12A is a block diagram depicting a configuration of the interconnect network 710 according to an example. The interconnect network 710 is configured to process the image 1102 shown in the example of FIG. 11 having the same convolutional parameters (e.g., filter 3×3, stride 2, and dilation 0). Since the interconnect network 710 supports one mode in the example, the multiplexers 720 are not required and are omitted.

In the example, the row buffer 708 includes at least five storage locations $709_1 \ldots 709_5$ for storing five samples of a row in the input image 1102. The shift registers 712 include at least two shift registers $712_1$ and $712_2$ to match the OW of the output image. The input $sr_1$ is coupled to outputs $d_1 \ldots d_3$ through a connection $718_1$. The connection $718_1$ includes three wires coupled to the outputs $d_1 \ldots d_3$, respectively. The input $sr_2$ is coupled to outputs $d_3 \ldots d_5$ through a connection $718_2$. The connection $718_2$ includes three wires coupled to the outputs $d_3 \ldots d_5$, respectively. Thus, for each row cycle, the shift register $712_1$ is parallel-loaded with image samples from $d_1 \ldots d_3$, and the shift register $712_2$ is parallel-loaded with image samples from $d_3 \ldots d_5$.

Figure 12B:
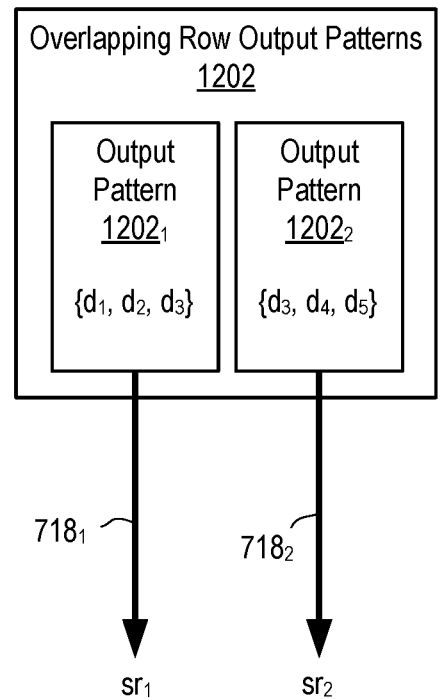
FIG. 12B is a block diagram depicting a logical arrangement of connections between a row buffer and shift registers according to the example of FIG. 12A.

FIG. 12B is a block diagram depicting a logical arrangement of connections between the row buffer 708 and the shift registers 712 according to the example of FIG. 12A. The interconnect network 710 forms overlapping row output patterns 1202. The overlapping row output patterns 1202 include an output pattern $1202_1$ and an output pattern $1202_2$. The output pattern $1202_1$ includes a pattern of storage locations 709 that provides the outputs $d_1 \ldots d_3$. The output pattern $1202_2$ includes a pattern of storage locations 709 that provides the outputs $d_3 \ldots d_5$. The output pattern $1202_1$ is coupled to the input $sr_1$ of the shift register $712_1$ by the connection $718_1$. The output pattern $1202_2$ is coupled to the input $sr_2$ of the shift register $712_2$ by the connection $718_2$. The output patterns $1202_1$ and $1202_2$ overlap by the output $d_3$. The output patterns 1202 are a result of the convolutional parameters used in the example (e.g., filter 3×3, stride 2, and dilation 0).

Figure 13:
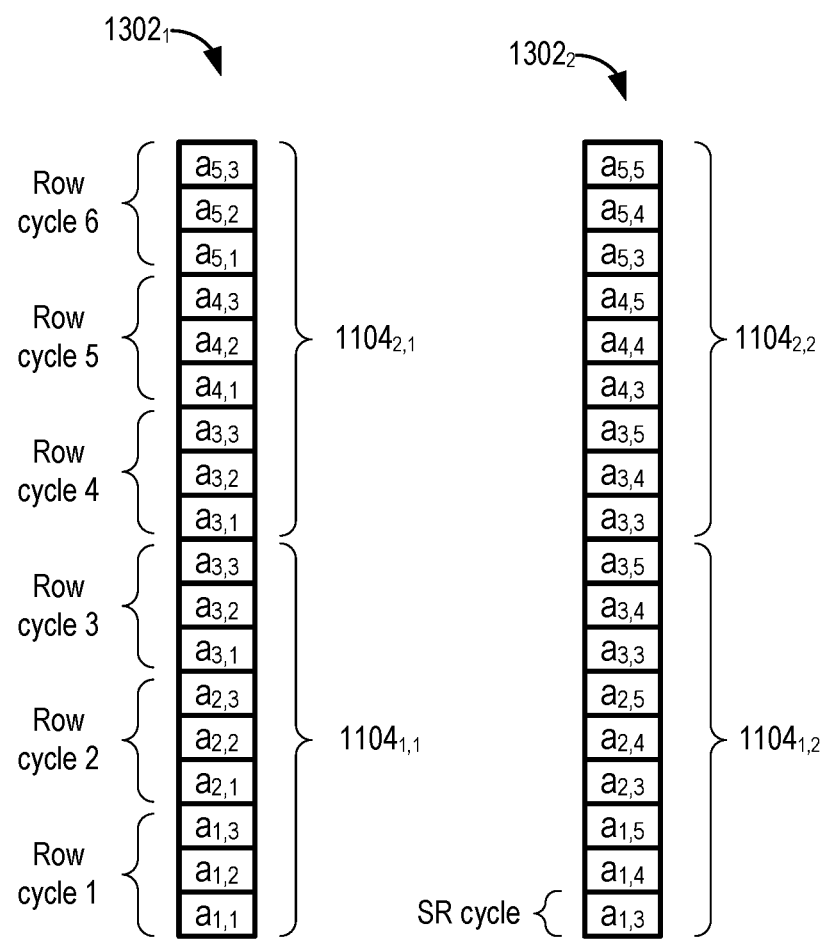
FIG. 13 illustrates sample streams output by shift registers in the example of FIG. 12A.

FIG. 13 illustrates the sample streams output by the shift registers $712_1$ and $712_2$ in the example of FIG. 12A. The shift register $712_1$ outputs a sample stream $1302_1$. The shift register $712_2$ outputs a sample stream $1302_2$. The input image 1102 is as shown in the example of FIG. 11. The sample stream $1302_1$ includes samples of the receptive field $1104_{1,1}$, followed by samples of the receptive field $1104_{2,1}$. The sample stream $1302_2$ includes samples of the receptive field $1104_{1,2}$, followed by samples of the receptive field $1104_{2,2}$. For each row cycle, a given stream includes a row of a particular receptive field. After three row cycles, a given stream includes an entire receptive field. After six row cycles, the parallel streams $1302_1$ and $1302_2$ output all of the receptive fields 1104. The sample patterns in the streams $1302_1$ and $1302_2$ are a result of the access patterns implemented by the connections $718_1$ and $718_2$ shown in FIG. 12A. Note that the streams $1302_1$ and $1302_2$ output all receptive fields 1104 without pre-computing and storing those receptive fields 1104. Rather, the image preprocessor 604 processes six rows of the original input image 1102 to generate the streams $1302_1$ and $1302_2$. Further, the processor 606 can begin the convolution operation in parallel with stream generation by the image preprocessor 604. The streams $1302_1$ and $1302_2$ are in a format suitable for dot product operations with filter vector(s).

Figure 14A:
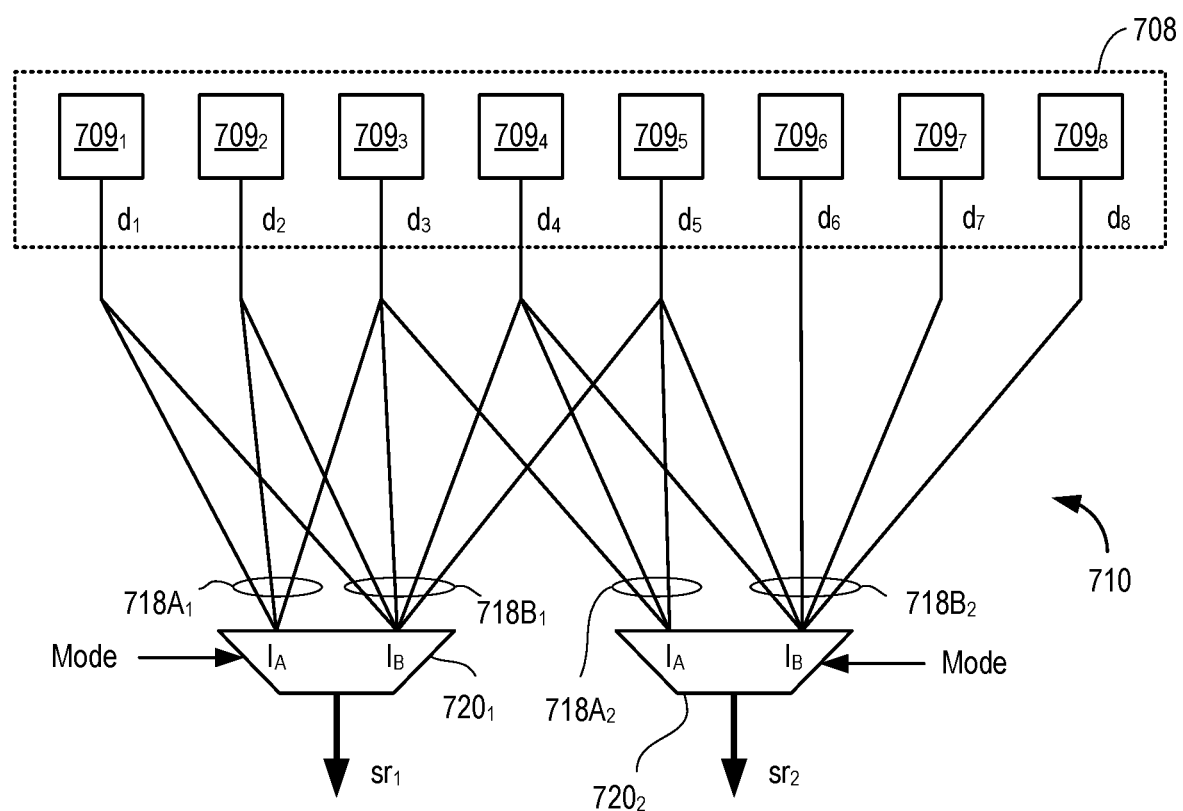
FIG. 14A is a block diagram depicting a configuration of an interconnect network according to another example.

FIG. 14A is a block diagram depicting a configuration of the interconnect network 710 according to another example. The interconnect network 710 is configured to process an image having a width (IW) of 8 (e.g., an 8×8 image). The interconnect network 710 supports two different modes. In a mode A, the filter size is 3×3, the stride is 2, and the dilation is 0. In a mode B, the filter size is 5×5, the stride is 3, and the dilation is 0. Since the interconnect network 710 supports multiple modes, multiplexers 720 are included.

In the example, the row buffer 708 includes at least eight storage locations $709_1 \ldots 709_8$ for storing up to eight samples of a row in the input image. The shift registers 712 include at least two shift registers $712_1$ and $712_2$ to match the OW of the output image. The input $sr_1$ is coupled to an output of a multiplexer $720_1$. The input $sr_{-2}$ is coupled to an output of the multiplexer $720_2$. Each of the multiplexers $720_1$ and $720_2$ includes two inputs $I_A$ and $I_B$, as well as a mode select input ("mode"). The port $I_A$ of the multiplexer $720_1$ is coupled to outputs $d_1 \ldots d_3$ through a connection $718A_1$. The connection $718A_1$ includes three wires coupled to the outputs $d_1 \ldots d_3$, respectively. The port $I_A$ of the multiplexer $720_2$ is coupled to outputs $d_3 \ldots d_5$ through a connection $718A_2$. The connection $718A_2$ includes three wires coupled to the outputs $d_3 \ldots d_5$, respectively. In the mode A, for each row cycle, the shift register $712_1$ is parallel-loaded with image samples from $d_1 \ldots d_3$, and the shift register $712_2$ is parallel-loaded with image samples from $d_3 \ldots d_5$.

The port $I_B$ of the multiplexer $720_1$ is coupled to outputs $d_1 \ldots d_5$ through a connection $718B_1$. The connection $718B_1$ includes five wires coupled to the outputs $d_1 \ldots d_5$, respectively. The port $I_B$ of the multiplexer $720_2$ is coupled to outputs $d_4 \ldots d_8$ through a connection $718B_2$. The connection $718B_2$ includes five wires coupled to the outputs $d_4 \ldots d_8$, respectively. In the mode B, for each row cycle, the shift register $712_1$ is parallel-loaded with image samples from $d_1 \ldots d_5$, and the shift register $712_2$ is parallel-loaded with image samples from $d_4 \ldots d_8$.

Figure 14B:
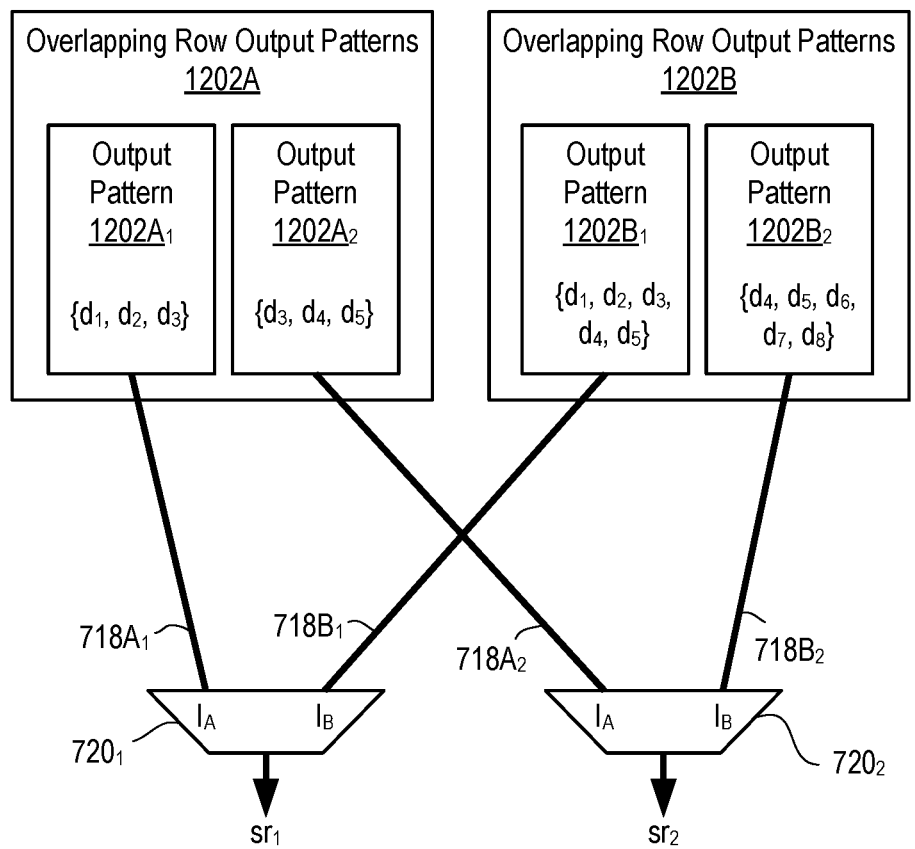
FIG. 14B is a block diagram depicting a logical arrangement of connections between a row buffer and shift registers according to the example of FIG. 14A.

FIG. 14B is a block diagram depicting a logical arrangement of connections between the row buffer 708 and the shift registers 712 according to the example of FIG. 14A. The interconnect network 710 forms overlapping row output patterns 1202A and 1202B for the modes A and B, respectively. The overlapping row output patterns 1202A include an output pattern $1202A_1$ and an output pattern $1202A_2$. The output pattern $1202A_1$ includes a pattern of storage locations 709 that provides the outputs $d_1 \ldots d_3$. The output pattern $1202A_2$ includes a pattern of storage locations 709 that provides the outputs $d_3 \ldots d_5$. The output pattern $1202A_1$ is coupled to the input $I_A$ of the multiplexer $720_1$ by the connection $718A_1$. The output pattern $1202A_2$ is coupled to the input $I_A$ of the multiplexer $720_2$ by the connection $718A_2$. The output patterns $1202A_1$ and $1202A_2$ overlap by the output $d_3$. The output patterns 1202A are a result of the convolutional parameters used in mode A (e.g., filter 3×3, stride 2, and dilation 0).

The overlapping row output patterns 1202B include an output pattern $1202B_1$ and an output pattern $1202B_2$. The output pattern $1202B_1$ includes a pattern of storage locations 709 that provides the outputs $d_1 \ldots d_5$. The output pattern $1202B_2$ includes a pattern of storage locations 709 that provides the outputs $d_4 \ldots d_8$. The output pattern $1202B_1$ is coupled to the input $I_B$ of the multiplexer $720_1$ by the connection $718B_1$. The output pattern $1202B_2$ is coupled to the input $I_B$ of the multiplexer $720_2$ by the connection $718B_2$. The output patterns $1202B_1$ and $1202B_2$ overlap by the outputs $d_4$ and $d_5$. The output patterns 1202B are a result of the convolutional parameters used in mode B (e.g., filter 5×5, stride 3, and dilation 0).

Figure 15:
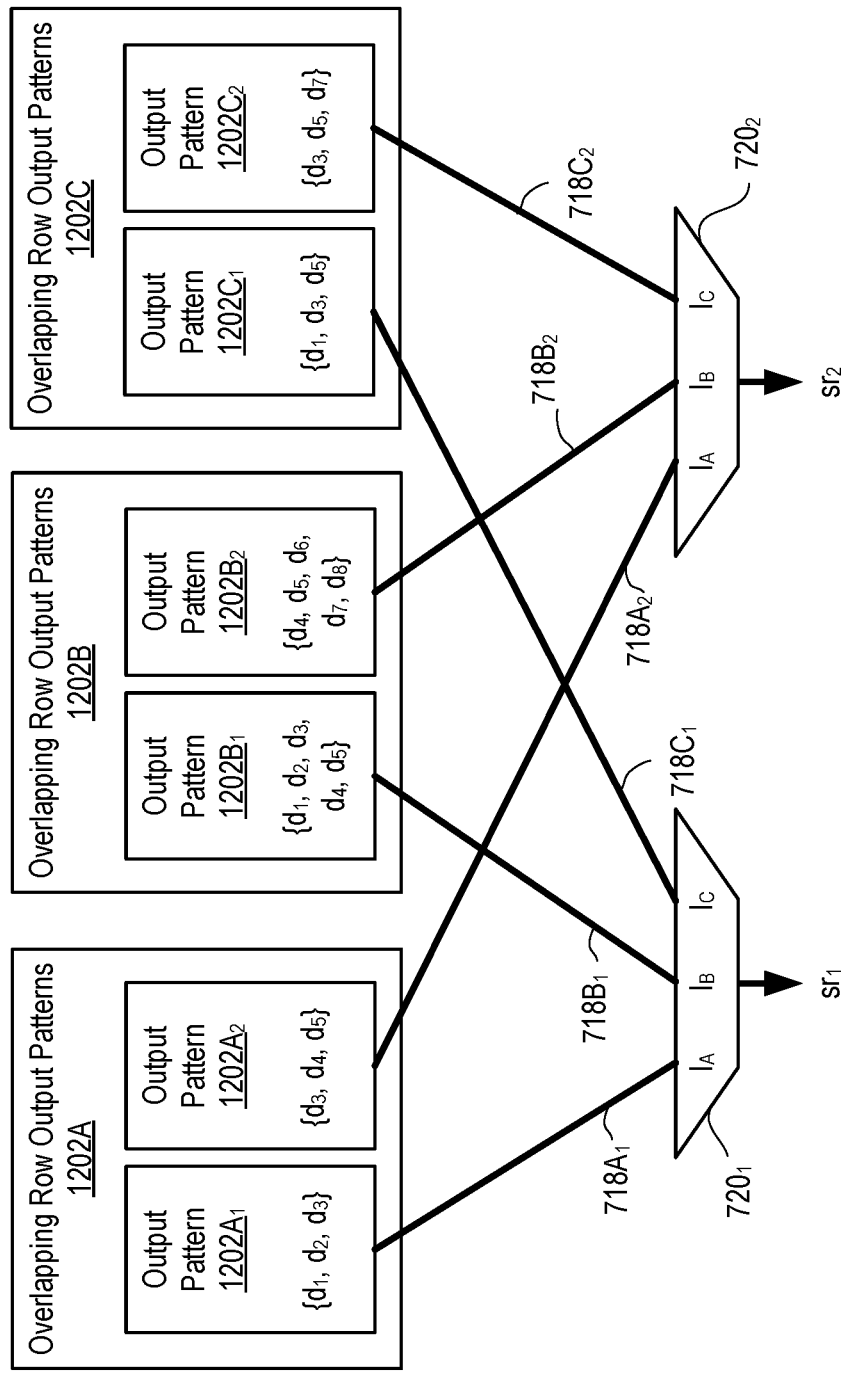
FIG. 15 is a block diagram depicting a logical arrangement of connections between a row buffer and shift registers according to another example.

FIG. 15 is a block diagram depicting a logical arrangement of connections between the row buffer 708 and the shift registers 712 according to another example. The interconnect network 710 is configured to process an image having a width (IW) of 8 (e.g., an 8×8 image) and supports three different modes. The interconnect network 710 forms overlapping row output patterns 1202A, 1202B, and 1202C for the modes A, B, and C respectively. The modes A and B are the same as in the example of FIG. 14B and are described in detail above. The mode C is defined by convolutional parameters that include a filter size of 3×3, a stride of 2, and a dilation of 1.

The overlapping row output patterns 1202C include an output pattern $1202C_1$ and an output pattern $1202C_2$. The output pattern $1202C_1$ includes a pattern of storage locations 709 that provides the outputs $d_1$, $d_3$, and $d_5$. The output pattern $1202C_2$ includes a pattern of storage locations 709 that provides the outputs $d_3$, $d_5$, and $d_7$. The output pattern $1202C_1$ is coupled to an input $I_C$ of the multiplexer $720_1$ by a connection $718C_1$. The output pattern $1202C_2$ is coupled to an input $I_C$ of the multiplexer $720_2$ by a connection $718C_2$. The output patterns $1202C_1$ and $1202C_2$ overlap by the outputs $d_3$ and $d_5$. The output patterns 1202C are a result of the convolutional parameters used in mode C (e.g., filter 3×3, stride 2, and dilation 1).

The example configurations of the interconnect network 710 shown in FIGS. 12A, 14A, and 15 are simplified for purposes of explanation. The configurations can be extended for larger image widths and different convolutional parameters. If only one mode is to be supported, the interconnect network 710 includes only wires connected between the row buffer 708 and the shift registers 712 to implement the specific access pattern associated with the convolutional parameters. If multiple modes are to be supported, the interconnect network 710 includes multiplexers having two or more inputs associated with the two or more modes.

Figure 16:
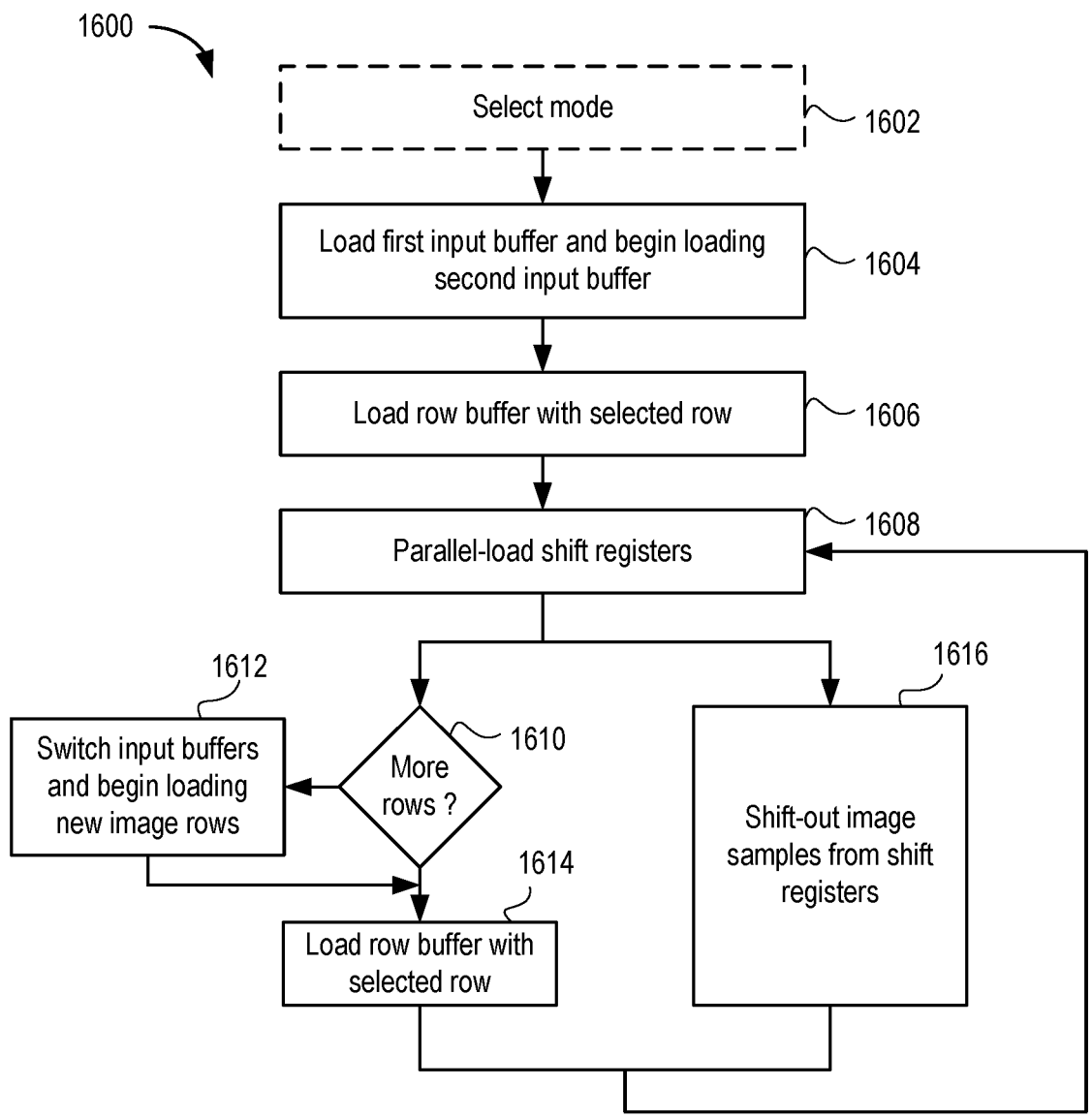
FIG. 16 is a flow diagram depicting a method of operation of the image preprocessor of FIG. 7 according to an example.

FIG. 16 is a flow diagram depicting a method 1600 of operation of the image preprocessor 604 according to an example. The method 1600 begins at optional step 1602, where the control circuit 714 selects the mode of operation if capable of multiple modes of operation. If the control circuit 714 only includes one mode of operation, then step 1602 is omitted. At step 1604, the control circuit 714 loads the input buffer $704_1$ and begins loading the input buffer $704_2$. For example, the control circuit 714 provides control signals (enable signals, clock signals, address data, etc.) to the read control circuit 703. The read control circuit 703 loads blocks of image data to the input buffers $704_1$ and $704_2$, as described above.

At step 1606, the control circuit 714 loads the row buffer 708 with a selected row. For example, the control circuit 714 provides control signals (enable signals, clock signals, etc.) to the row selector circuit 706 to select a row and load the row buffer 708. The row buffer 708 is loaded according to a row clock.

At step 1608, the control circuit 714 parallel-loads the shift registers 712 with the contents of the row buffer 708 through the interconnect network 710. The interconnect network 710 implements the access pattern of the selected (or only) mode.

From step 1608, the method 1600 performs subsequent steps concurrently. At step 1616, the control circuit 714 shifts-out image samples from the shift registers 712 to generate the sample streams. The samples are shifted out according to a sample clock. Concurrently, at step 1610, the row selector 706 determines if there are more rows in the current image block to be processed. If so, the method 1600 proceeds to step 614, where the row selector 706 loads the row buffer 708 with a selected row. If not, the method 1600 proceeds first to step 1612, where the row selector 706 switches input buffers and the read control circuit 703 begins loading the previously used input buffer with new image data. The method 1600 returns to step 1608 and repeats.

Figure 17:
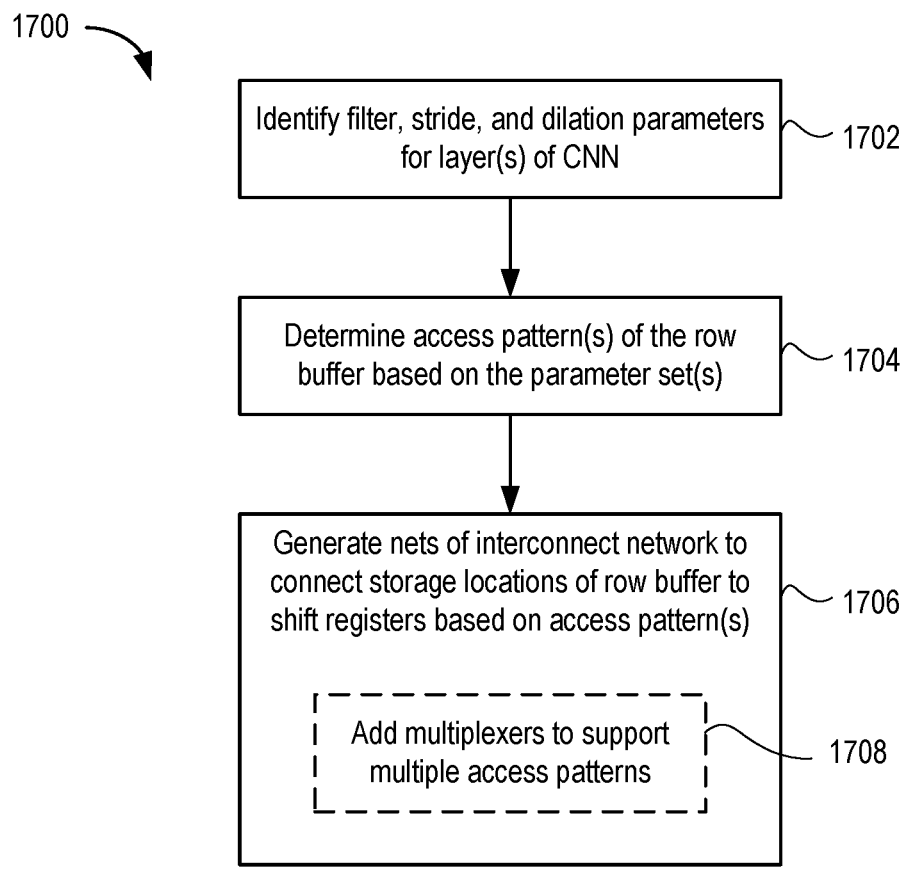
FIG. 17 is a flow diagram depicting a method of designing the image preprocessor of FIG. 7 according to an example.

FIG. 17 is a flow diagram depicting a method 1700 of designing the image preprocessor 604 according to an example. The method 1700 can be executed on a computer system, such as the computer system 102, using the design tool(s) 104. The method 1700 begins at step 1702, where the design tool(s) 104 identify filter, stride, and dilation parameters for one or more convolutional layers. At step 1704, the design tool(s) determine access pattern(s) of the row buffer 708 based on the parameter set(s) identified in step 1702. At step 1706, the design tool(s) 104 generate nets of the interconnect network 710 to connect storage locations 709 of the row buffer 708 to the shift registers 712 based on the determined access pattern(s). At optional step 1708, the design tool(s) 104 add multiplexers 720 to the interconnect network 710 to support multiple access patterns.

While the foregoing is directed to specific examples, other and further examples may be devised without departing from the basic scope thereof, and the scope thereof is determined by the claims that follow.

What is claimed is:

1. A preprocessor circuit for formatting image data into a plurality of streams of image samples, the preprocessor circuit comprising:
a first buffer configured to store a plurality of rows of the image data and output a row of the plurality of rows;
a second buffer, coupled to the first buffer, including a first plurality of storage locations configured to store a respective plurality of image samples of the row output by the first buffer;
a plurality of shift registers, wherein each of the plurality of shift registers comprises a second plurality of storage locations comprising an input coupled to outputs of the first plurality of storage locations and an output, the second plurality of storage locations configured to:
receive, via the input, one or more of the plurality of image samples from the outputs of the first plurality of storage locations;
store the one or more of the plurality of image samples; and
output, via the output, a respective stream of the plurality of streams of image samples based on the stored one or more of the plurality of image samples;
an interconnect network including a plurality of connections, the plurality of connections coupling the inputs of the second plurality of storage locations of each of the plurality of shift registers to a different one or more of the outputs of the first plurality of storage locations in the second buffer, one or more of the inputs of the first plurality of storage locations in the second buffer being coupled to more than one of the plurality of connections; and
a control circuit configured to load the plurality of shift registers with the plurality of image samples based on the plurality of connections and shift the plurality of shift registers to output the plurality of streams of image samples.

2. The preprocessor circuit of claim 1, wherein the plurality of connections is a plurality of first connections, wherein the interconnect network includes a plurality of multiplexers, wherein each multiplexer includes a first input coupled to a respective one of the plurality of first connections, and an output coupled to a respective one of the plurality of shift registers.

3. The preprocessor circuit of claim 2, wherein the interconnect network includes a plurality of second connections, each second connection of the plurality of second connections coupling more than one of the first plurality of storage locations to a second input of a respective one of the plurality of multiplexers, one or more of the first plurality of storage locations being coupled to more than one of the plurality of second connections.

4. The preprocessor circuit of claim 3, wherein the control circuit is configured to set a mode of the interconnect network to control the plurality of multiplexers to select one of the plurality of first connections or the plurality of second connections.

5. The preprocessor circuit of claim 1, wherein a pattern of the first plurality of storage locations coupled to a first shift register of the plurality of shift registers through a first connection of the plurality of connections overlaps a pattern of the first plurality of storage locations coupled to a second shift register of the plurality of shift registers through a second connection of the plurality of connections.

6. The preprocessor circuit of claim 1, wherein different patterns of the first plurality of storage locations are defined by parameters of a convolution between the image data and a filter, the parameters including a width of the filter, a horizontal stride, and a horizontal dilation.

7. An integrated circuit (IC), comprising:
a memory controller configured to access a memory having image data stored therein;
an image preprocessor, coupled to the memory controller, configured to obtain the image data and generate a plurality of streams of image samples from the image data; and
a processor, coupled to the image preprocessor, configured to process the plurality of streams of image samples;
wherein the image preprocessor includes:
a first buffer configured to store a plurality of rows of the image data and output a row of the plurality of rows;
a second buffer, coupled to the first buffer, including a first plurality of storage locations configured to store a respective plurality of image samples of the row output by the first buffer;
a plurality of shift registers, wherein each of the plurality of shift registers comprises a second plurality of storage locations comprising an input coupled to outputs of the first plurality of storage locations and an output, the second plurality of storage locations configured to:
receive, via the input, one or more of the plurality of image samples from the outputs of the first plurality of storage locations;
store the one or more of the plurality of image samples; and
output, via the output, a respective stream of the plurality of streams of image samples based on the stored one or more of the plurality of image samples;
an interconnect network including a plurality of connections, the plurality of connections coupling the inputs of the second plurality of storage locations of each of the plurality of shift registers to a different one or more of the outputs of the first plurality of storage locations in the second buffer, one or more of the outputs of the first plurality of storage locations being coupled to more than one of the plurality of connections; and
a control circuit configured to load the plurality of shift registers with the plurality of image samples based on the plurality of connections and shift the plurality of shift registers to output the plurality of streams of image samples.

8. The IC of claim 7, wherein the plurality of connections is a plurality of first connections, wherein the interconnect network includes a plurality of multiplexers, wherein each multiplexer includes a first input coupled to a respective one of the plurality of first connections, and an output coupled to a respective one of the plurality of shift registers.

9. The IC of claim 8, wherein the interconnect network includes a plurality of second connections, each of the plurality of second connections coupling more than one of the first plurality of storage locations to a second input of a respective one of the plurality of multiplexers, one or more of the first plurality of storage locations being coupled to more than one of the plurality of second connections.

10. The IC of claim 9, wherein the control circuit is configured to set a mode of the interconnect network to control the plurality of multiplexers to select one of the plurality of first connections or the plurality of second connections.

11. The IC of claim 7, wherein a pattern of the first plurality of storage locations coupled to a first shift register of the plurality of shift registers through a first connection of the plurality of connections overlaps a pattern of the first plurality of storage locations coupled to a second shift register of the plurality of shift registers through a second connection of the plurality of connections.

12. The IC of claim 7, wherein different patterns of the first plurality of storage locations are defined by parameters of a convolution between the image data and a filter, the parameters including a width of the filter, a horizontal stride, and a horizontal dilation.

13. The IC of claim 7, wherein the processor is a systolic array of data processing units.

14. A method of formatting image data into a plurality of streams of image samples, comprising:

storing a plurality of rows of the image data, and an output row of the plurality of rows, in a first buffer;

storing a respective plurality of image samples of the row output by the first buffer in a first plurality of storage locations of a second buffer;

loading a second plurality of storage locations of each of a plurality of shift registers with the plurality of image samples based on a plurality of connections of an interconnection network, each connection of the plurality of connections coupling an input of the second plurality of storage locations of each of the plurality of shift registers to an output of more than one of the first plurality of storage locations, one or more of the first plurality of storage locations in the second buffer being coupled to a different one or more than one of the plurality of connections; and shifting the plurality of shift registers to output the plurality of streams of image samples from the second plurality of storage locations.

15. The method of claim 14, wherein different patterns of the first plurality of storage locations are defined by parameters of a convolution between the image data and a filter, the parameters including a width of the filter, a horizontal stride, and a horizontal dilation.

16. The method of claim 14, wherein the plurality of connections is a plurality of first connections, wherein the interconnect network includes a plurality of multiplexers, wherein each multiplexer includes a first input coupled to a respective one of the plurality of first connections, and an output coupled to a respective one of the plurality of shift registers.

17. The method of claim 16, wherein the interconnect network includes a plurality of second connections, each of the plurality of second connections coupling more than one of the first plurality of storage locations to a second input of a respective one of the plurality of multiplexers, one or more of the first plurality of storage locations being coupled to more than one of the plurality of second connections.

* * * * *